(12) United States Patent
Meyerson et al.

(10) Patent No.: US 12,033,079 B2
(45) Date of Patent: Jul. 9, 2024

(54) SYSTEM AND METHOD FOR PSEUDO-TASK AUGMENTATION IN DEEP MULTITASK LEARNING

(71) Applicant: Cognizant Technology Solutions U.S. Corporation, College Station, TX (US)

(72) Inventors: Elliot Meyerson, San Francisco, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 691 days.

(21) Appl. No.: 16/270,681

(22) Filed: Feb. 8, 2019

(65) Prior Publication Data

US 2019/0244108 A1      Aug. 8, 2019

Related U.S. Application Data

(60) Provisional application No. 62/684,125, filed on Jun. 12, 2018, provisional application No. 62/628,248, filed on Feb. 8, 2018.

(51) Int. Cl.
*G06N 3/084* (2023.01)
*G06N 3/04* (2023.01)
(Continued)

(52) U.S. Cl.
CPC ............... *G06N 3/084* (2013.01); *G06N 3/04* (2013.01); *G06N 3/044* (2023.01); *G06N 3/045* (2023.01)

(58) Field of Classification Search
CPC .......... G06N 3/084; G06N 3/04; G06N 3/044; G06N 3/045; G06N 3/048; G06N 3/063; G06N 3/082
See application file for complete search history.

(56) References Cited

U.S. PATENT DOCUMENTS 5,140,530 A     8/1992   Guha et al.
5,761,381 A     6/1998   Arci et al.
(Continued)

FOREIGN PATENT DOCUMENTS

EP     0762294 A2    3/1997
EP     2422276       2/2012
(Continued)

OTHER PUBLICATIONS

Loy, Facial landmark detection by deep multi-task learning. In Proceedings of ECCV'14, 2014 (Year: 2014).*
(Continued)

*Primary Examiner* — Aniss Chad
*Assistant Examiner* — Shien Ming Chou
(74) *Attorney, Agent, or Firm* — Dawn-Marie Bey; Bey & Cotropia PLLC

(57) ABSTRACT

A multi-task (MTL) process is adapted to the single-task learning (STL) case, i.e., when only a single task is available for training. The process is formalized as pseudo-task augmentation (PTA), in which a single task has multiple distinct decoders projecting the output of the shared structure to task predictions. By training the shared structure to solve the same problem in multiple ways, PTA simulates the effect of training towards distinct but closely-related tasks drawn from the same universe. Training dynamics with multiple pseudo-tasks strictly subsumes training with just one, and a class of algorithms is introduced for controlling pseudo-tasks in practice.

28 Claims, 10 Drawing Sheets

(51) Int. Cl.
  *G06N 3/044* (2023.01)
  *G06N 3/045* (2023.01)

(56) References Cited

U.S. PATENT DOCUMENTS

| | | | |
|---|---|---|---|
| 5,845,266 A | 12/1998 | Lupien et al. | |
| 5,920,848 A | 7/1999 | Schutzer et al. | |
| 5,930,780 A | 7/1999 | Hughes et al. | |
| 6,240,399 B1 | 5/2001 | Frank et al. | |
| 6,249,783 B1 | 6/2001 | Crone et al. | |
| 7,013,344 B2 | 3/2006 | Megiddo | |
| 7,246,075 B1 | 7/2007 | Testa | |
| 7,370,013 B1 | 5/2008 | Aziz et al. | |
| 7,444,309 B2 | 10/2008 | Branke et al. | |
| 8,527,433 B2 | 9/2013 | Hodjat et al. | |
| 8,639,545 B2 | 1/2014 | Cases et al. | |
| 8,768,811 B2 | 7/2014 | Hodjat et al. | |
| 8,909,570 B1 | 12/2014 | Hodjat et al. | |
| 8,918,349 B2 | 12/2014 | Hodjat | |
| 8,977,581 B1 | 3/2015 | Hodjat et al. | |
| 9,002,759 B2 | 4/2015 | Hodjat et al. | |
| 9,053,431 B1 | 6/2015 | Commons | G06N 3/08 |
| 9,466,023 B1 | 10/2016 | Shahrzad et al. | |
| 9,785,886 B1 | 10/2017 | Andoni | |
| 2002/0019844 A1 | 2/2002 | Kurowski et al. | |
| 2003/0014379 A1 | 1/2003 | Saias et al. | |
| 2003/0158887 A1 | 8/2003 | Megiddo | |
| 2004/0143559 A1 | 7/2004 | Ayala | |
| 2004/0210545 A1 | 10/2004 | Branke et al. | |
| 2004/0254901 A1 | 12/2004 | Bonabeau et al. | |
| 2005/0033672 A1 | 2/2005 | Lasry et al. | |
| 2005/0136480 A1 | 6/2005 | Brahmachari et al. | |
| 2005/0187848 A1 | 8/2005 | Bonissone et al. | |
| 2005/0197875 A1 | 9/2005 | Kauffman | |
| 2005/0198103 A1 | 9/2005 | Ching | |
| 2006/0218107 A1 | 9/2006 | Young | |
| 2007/0100907 A1 | 5/2007 | Bayer | |
| 2007/0143198 A1 | 6/2007 | Brandes et al. | |
| 2007/0143759 A1 | 6/2007 | Ozgur et al. | |
| 2007/0150435 A1 | 6/2007 | Murakawa et al. | |
| 2007/0185990 A1 | 8/2007 | Ono et al. | |
| 2008/0071588 A1 | 3/2008 | Eder | |
| 2008/0228644 A1 | 9/2008 | Birkestrand et al. | |
| 2009/0125370 A1 | 5/2009 | Blondeau et al. | |
| 2009/0307638 A1 | 12/2009 | McConaghy | |
| 2009/0327178 A1 | 12/2009 | Jacobson | |
| 2010/0030720 A1 | 2/2010 | Stephens | |
| 2010/0111991 A1 | 5/2010 | Raitano et al. | |
| 2010/0182935 A1 | 7/2010 | David | |
| 2010/0256795 A1 | 10/2010 | McLaughlin et al. | |
| 2010/0257228 A1 | 10/2010 | Staggs et al. | |
| 2010/0257605 A1 | 10/2010 | McLaughlin et al. | |
| 2010/0274736 A1 | 10/2010 | Hodjat et al. | |
| 2010/0274742 A1 | 10/2010 | Hodjat et al. | |
| 2010/0293119 A1 | 11/2010 | Ferringer et al. | |
| 2011/0161264 A1 | 6/2011 | Cantin | |
| 2011/0246834 A1 | 10/2011 | Rajashekara et al. | |
| 2012/0239517 A1 | 9/2012 | Blondeau et al. | |
| 2012/0239592 A1 | 9/2012 | Esbensen | |
| 2012/0313798 A1 | 12/2012 | Markram | 341/50 |
| 2013/0124440 A1 | 5/2013 | Hodjat et al. | |
| 2013/0254142 A1 | 9/2013 | Hodjat et al. | |
| 2013/0311412 A1 | 11/2013 | Lazar et al. | G06N 3/08 |
| 2014/0006316 A1 | 1/2014 | Hodjat et al. | |
| 2014/0011982 A1 | 1/2014 | Marasco et al. | |
| 2015/0288573 A1 | 10/2015 | Baughman et al. | |
| 2016/0048753 A1 | 2/2016 | Sussillo et al. | G06N 3/04 |
| 2016/0063359 A1 | 3/2016 | Szegedy et al. | |
| 2016/0283563 A1 | 9/2016 | Hodjat et al. | |
| 2016/0307071 A1* | 10/2016 | Perronnin | G06F 18/214 |
| 2016/0329047 A1 | 11/2016 | Tur | |
| 2016/0329407 A1 | 11/2016 | Takemura | |
| 2016/0364522 A1 | 12/2016 | Frey et al. | |
| 2017/0001093 A1 | 1/2017 | Mollice | |
| 2017/0060963 A1 | 3/2017 | Whittaker et al. | |
| 2017/0109355 A1 | 4/2017 | Li et al. | |
| 2017/0148433 A1 | 5/2017 | Catanzaro et al. | |
| 2017/0193367 A1 | 7/2017 | Miikkulainen et al. | |
| 2017/0213156 A1 | 7/2017 | Hammond et al. | |
| 2017/0256254 A1* | 9/2017 | Huang | G10L 15/063 |
| 2017/0323219 A1 | 11/2017 | Shahrzad et al. | |
| 2017/0323636 A1 | 11/2017 | Xiao et al. | G10L 15/16 |
| 2018/0053092 A1 | 2/2018 | Hajizadeh | |
| 2018/0114115 A1 | 4/2018 | Liang et al. | G06N 3/086 |
| 2018/0114116 A1 | 4/2018 | Liang et al. | G06N 3/086 |
| 2018/0240041 A1 | 8/2018 | Koch et al. | |
| 2018/0357566 A1* | 12/2018 | Liu | G06N 7/01 |
| 2019/0065954 A1 | 2/2019 | Bittner, Jr. et al. | |

FOREIGN PATENT DOCUMENTS

| | | |
|---|---|---|
| EP | 2422278 | 2/2012 |
| JP | H0810804 | 1/1996 |
| JP | 08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007207173 | 8/2007 |
| JP | 2007522547 | 8/2007 |
| JP | 2008129984 | 6/2008 |
| WO | WO 2005/073854 | 8/2005 |
| WO | WO 2010/120440 | 10/2010 |
| WO | WO2010/127039 | 11/2010 |
| WO | WO2010/127042 | 11/2010 |
| WO | WO2017/161233 | 9/2017 |
| WO | WO2018/211138 | 11/2018 |
| WO | WO2018/213840 | 11/2018 |

OTHER PUBLICATIONS

Dong, Multi-task learning for multiple language translation. In Proc. of ACL, pp. 1723-1732, 2015 (Year: 2015).*
Caruana, R. Multitask learning. In Learning to learn, pp. 95-133. Springer US, 1998, (Year: 1998).*
Rennie, Annealed dropout training of deep networks, 2014 IEEE Spoken Language Technology Workshop (SLT) 2014 (Year: 2014).*
Loy C.C. Tang X. Zhang Z., Luo P. Facial landmark detection by deep multi-task learning. In Proceedings of ECCV'14, 2014 (Year: 2014).*
Dong, D., Wu, H., He, W., Yu, D., and Wang, H. Multi-task learning for multiple language translation. In Proc. of ACL, pp. 1723-1732, 2015 (Year: 2015).*
Deychakiwsky Normalized Cross-Entropy _ Deylemma, github.io 2020 (Year: 2020).*
CS412 KL-divergence, computer science, Illinois university. 2017 (Year: 2017).*
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=IwAR3hreOvBGmJZe54-631X49XedcbsQoDYIRu87BcCHEBf_vMKF8FDKK_7Nw.
Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.
International Search Report and Written Opinion for PCT Application No. PCT/US2019/017175, dated Jun. 5, 2019, 10 pp.
E. Meyerson and R. Miikulainen, "Pseudo-Task Augmentation: From Deep Multitask Learning to Intratask Sharing and Back," ICML, 2018.
J. Z. Liang, et al., "Evolutionary Architecture Search For Deep Multitask Networks," GECCO, 2018.
E. Meyerson and R. Miikulainen, "Beyond Shared Hierarchies: Deep Multitask Learning Through Soft Layer Ordering," ICLR, 2018.
R. Miikkulainen, et al., "Evolving Deep Neural Networks," arXiv prepring arXiv:1703.00548, 2017.

(56) References Cited

OTHER PUBLICATIONS

Alex Castrounis, Innoarchtech, "Python vs. R for AI, Machine Learning, and Data Science," published by O'Reilly Media, Copyright InnoArchiTech LLC 2020, 27 pages.
Bilen et al. "Integrated Perception with Recurrent Multi-Task Neural Networks", NIPS, 2016, pp. 9.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723.1883738, (Mar. 15, 2019), XP019146179.
Garcia-Pedrajas, et. al., "Cooperative-Coevolution-of-Artificial-Neural-Networks", 2005, 32 pages.
Georgilakis, P.S. "Genetic Algorithm Model for Profit Maximization of Generating Companies in Deregulated Electricity Markets", Applied Artificial Intelligence, Jul. 2009, 23:6,538-552.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
International Search Report and Written Opinion for PCT Application No. PCT/US18/65472, dated Mar. 27, 2019, 8 pp.
International Search Report and Written Opinion for PCT Application No. PCT/US2008/82876, Dec. 23, 2008, 8 pp.
Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.
Stanley et al. "Evolving neural networks through augmenting topologies." Evolutionary computation 10.2, 29 pages (2002) (Year: 2002).
U.S. Appl. No. 15/794,905, titled Evolution of Deep Neural Network Structures, 46 pages, filed Oct. 26, 2017.
Written Opinion from Singapore Patent Office in related application SG 201003127-6, dated Jun. 16, 2011, 9 pp.
Bilen, et al., "Integrated Perception with Recurrent Multi-Task Neural Networks," NIPS, 2016, 9 pp.
International Search Report and Written Opinion for PCT App. No. PCT/US19/61198, dated Mar. 11, 2020, 15 pp.
Moriarty, David E., et al., "Forming neural networks through efficient and adaptive coevolution," Evolutionary Computation 5.4, 1997.
Lee, Chi-Ho, et al., "Evolutionary ordered neural network with a linked-list encoding scheme," Proceedings of IEEE International Conference on Evolutionary Computation, IEEE, 1996.
Bredeche, Nicolas, et al., "On-line, on-board evolution of robot controllers," International Conference on Artificial Evolution, Springer, Berlin, Heidelberg, 2009.
Utech, J., et al., "An evolutionary algorithm for drawing directed graphs," Proc. of the Int. Conf. on Imaging Science, Systems and Technology, 1998.
International Preliminary Report on Patentability for PCT App. PCT/US2019/061198, dated Nov. 18, 2020, 24 pp.
Pantridge, et al., "Evolution of Layer Based Neural Networks: Preliminary Report," GECCO '16, pp. 1015-1022, Jul. 2016.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
Risto Miikkulainen, "Evolving Multitask Neural Network Structure," The University of Texas at Austin and Sentient Technologies, Inc., Aug. 26, 2013.
Bonadiman, et al., "Multitask Learning with Deep Neural Networks For Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.
Ruder, "An Overview of Multi-Task Learning in Deep Neural Networks," In: Cornell University Library/Computer Science/Machine Learning, Jun. 15, 2017 [online] [retrieved on Mar. 15, 2019], Retrieved from the Internet: https://arxiv.org/abs/1706.05098.
Hodjat et al., "Chapter 5: Introducing an Age-Varying Fitness Estimation Function." Genetic Programming Theory and Practice X. Ed. Riolo et al., Springer Apr. 19, 2013, pp. 59-71.
Gonzalez, et al., "Evolving Loss Functions With Multivariate Taylor Polynomial Parameterizations." Version 1, published arXiv: 2002.00059v1, Jan. 31, 2020.
Gonzalez, et al., "Evolving Loss Functions With Multivariate Taylor Polynomial Parameterization," Version 2, published arXiv: 2002.00059v2), Feb. 10, 2020.
Gonzalez, et al., "Optimizing Loss Functions Through Multivariate Taylor Polynomial Parameterization," Version 3 (published arXiv:2002.00059v3), Jun. 6, 2020.
N. Hansen, et al, "Adapting arbitrary normal mutation distributions in evolution strategies: The covariance matrix adaptation," In Proceedings of IEEE International Conference on Evolutionary Computation, pp. 312-317, IEEE, 1996.
Hansen, et al., "Completely derandomized self-adaptation in evolution strategies," Evolutionary Computation, vol. 9, No. 2, pp. 159-195, 2001.
N. Hansen, et al., "Evaluating the CMA evolution strategy on multimodal test functions," International Conference on Parallel Problem Solving from Nature, Springer, pp. 282-291, 2004.
Liang, et al., "Population-Based Training for Loss Function Optimization," arXiv:2002.04225v1 (Feb. 11, 2020).
"Python vs. R for Artificial Intelligence, Machine Learning, and Data Science," by Scenario or Task by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/python-vs-or-r-artificial-intelligence-ai-machine-learning-data-science-which-use, 27 pp.
Production vs Development Artificial Intelligence and Machine Learning, by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/development-vs-or-production-batch-offline-online-automated-artificial intelligence-ai-machine-learning, 24 pp.
"Advanced Analytics Packages, Frameworks, and Platforms," by Alex Castrounis of Innoarchitech, published online by O'Reilly Media, Copyright InnoArchiTech LLC 2020 [retrieved Oct. 16, 2020], Retrieved from the Internet: https://www.innoarchitech.com/blog/packages-frameworks-platforms-by-scenario-task-artificial intelligence-ai-machine-learning-data-science, 29 pp..
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019.
Santiago Gonzalez, et al., "Improved Training Speed, Accuracy, and Data Utilization Through Loss Function Optimization," Version 2, arXiv: 1905.11528v2, dated Feb. 10, 2020.
Santiago Gonzalez, et al., "Improved Training Speed, Accuracy, and Data Utilization Through Loss Function Optimization," Version 3, arXiv: 1905.11528v3, dated Apr. 27, 2020.
J. T. Barron, "A General and Adaptive Robust Loss Function," arXiv: 1701.03077v6, 2018.
K. Janocha and W. M. Czarnecki, "On Loss Functions For Deep Neural Networks in Classification," arXiv: 1702.05659, 2017.
A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.
"CS 224D: Deep Learning for NLP, Lecture Notes: Part III", 14 pp., Spring, 2016.
"CS 224D: Deep Learning for NLP, Lecture Notes: Part IV", 12 pp., Spring, 2015.
"CS 224D: Deep Learning for NLP, Lecture Notes: Part V", 6 pp., Spring, 2015.
U.S. Appl. No. 62/468,224, titled "Asynchronous Evaluation Strategy For Evolution of Deep Neural Networks," filed Mar. 7, 2017.

(56) References Cited

OTHER PUBLICATIONS

Aditya Rawal and Risto Miikkulainen, "From Nodes to Networks: Evolving Recurrent Neural Networks." GECCO '18, Jul. 15-19, 2018, Kyoto, Japan.
Julian G. Zilly, Rupesh Kumar Srivastava, Jan Koutnik, and Jurgen Schmidhuber, "Recurrent Highway Networks." CoRR abs/1607.03474. 2016 (Arxiv: 1607.03474).
U.S. Appl. No. 62/627,658, titled "From Nodes to Networks: Evolving Recurrent Neural Networks," filed Feb. 7, 2018.
U.S. Appl. No. 62/627,161, titled "From Nodes to Networks: Evolving Recurrent Neural Networks." filed Feb. 6, 2018.
U.S. Appl. No. 62/598,409, titled "Evolving Multitask Neural Network Structure." filed Dec. 13, 2017.
Lehman, Joel, et al., "Exploiting open-endedness to solve problems through the search for novelty," ALIFE, 2008.
U.S. Appl. No. 13/184,307, filed Jul. 15, 2011 entitled "Data Mining Technique with Experience-Layered Gene Pool," 47 pages.
Hodjat, B., et al., "Introducing an Age-Varying Fitness Estimation Function," Genetic Finance, Chapter 5, Genetic Programming Theory and Practice, Springer Science+Business Media New York. Copyright 2013. pp. 59-71.
U.S. Appl. No. 14/595,991—Office Action dated May 10, 2017, 32 pages.
Hodjat et. al., "nPool: Massively Distributed Simultaneous Evolution and Cross-Validation in EC-Star," Sentient Technologies, May 2015, pp. 1-12.
Al-Haj Baddar, "Finding Better Sorting Networks," Dissertation to Kent State University for PhD, May 2009, 86 pages.
Cuccu, G., et al., "When Novelty is Not Enough," vol. 6624 in Lecture Notes in Computer Science, published in Applications of Evolutionary Computation, Springer-Verlag Berlin Heidelberg, Copyright 2011, pp. 234-243.
Gomes et al., "Devising Effective Novelty Search Algorithms: A Comprehensive Empirical Study," GECCO '15, Madrid, Spain, Jul. 11-15, 2015, ACM (Copyright 2015), 8 pages.
Gomes et al., "Evolution of Swarm Robotics Systems with Novelty Search," published in Swarm Intelligence, vol. 7, Issue 2, ANTS Special Issue, 2013, pp. 115-144.
Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.
Gupta et al., "An Overview of methods maintaining Diversity in Generic Algorithms," International Journal of Emerging Technology and Advanced Engineering, vol. 2, Issue 5, May 2012, pp. 56-60.
Hodjat et al, "Maintenance of a Long Running Distributed Genetic Programming System for Solving Problems Requiring Big Data," Genetic Finance Chap 1, published in Genetic Programming Theory and Practice XI as Chapter 4, 2014, 20 pages.
Kipfer et al., "UberFlow: A GPU-Based Particle Engine," Computer Graphics and Visualization, The Eurographics Association, Copyright 2004, 9 pages.
Krcah et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.
Lehman et al., "Abandoning Objectives: Evolution through the Search for Novelty Alone," Evolutionary Computation journal, (19):2, MIT Press, Copyright 2011, pp. 189-223.
Lehman et al., "Efficiently Evolving Programs through the Search for Novelty," Proceedings of the Genetic and Evolutionary Computation Conference, ACM, New York NY, Copyright 2010, 8 pages.
Lehman et al., "Evolving a Diversity of Creatures through Novelty Search and Local Competition," Proceedings of the Genetic and Evolutionary Computation Conference, ACM, New York, NY, 2011, 8 pages.
Lehman et al., "Extinction Events Can Accelerate Evolution," PLOS One, journal.pone.0132886, Aug. 12, 2015, 16 pages.
Lehman et al., "Overcoming Deception in Evolution of Cognitive Behaviors," University of Texas at Austin, ACM, Jul. 12-16, 2014, 8 pages.
Lehman et al., "Revising the Evolutionary Computation Abstraction: Minimal Criteria Novelty Search," Proceedings of the Genetic and Evolutionary Computation Conference, GECCO 2010, ACM, 2010, 8 pages.
Mouret et al., "Encouraging Behavioral Diversity in Evolutionary Robotics: An Empirical Study," Massachusetts Institute of Technology, Copyright 2012, Evolutionary Computation 20(1), Spring, 2012, pp. 91-133.
Oreilly, U., et al., "EC-Star: A Massive-Scale, HUB and Spoke, Distributed Genetic Programming System," Evolutionary Design and Optimization Group, published in Genetic Programming Theory and Practice X as Chapter 6, published in V as Chap 1, Springer New York, Copyright 2013, 13 pages.
Salge, C., et al., "Empowerment—An Introduction," published in Guided Self-Organization: Inception, Chap 4, University of Hertfordshire, Copyright 2013, pp. 67-114.
Secretan, J., et al., "Picbreeder: A Case Study in Collaborative Evolutionary Exploration of Design Space," Evolutionary Computation journal, MIT Press, Copyright 2011, 30 pages.
Shahrzad, H., et al., "Tackling the Boolean Multiplexer Function Using a Highly Distributed Genetic Programming System," published in Genetic Programming Theory and Practice XII, Springer International Publishing, Copyright 2015, pp. 167-179.
Valsalam, V.K., et al., "Using Symmetry and Evolutionary Search to Minimize Sorting Networks," Journal of Machine Learning Research 14, The University of Texas at Austin, Department of Computer Science, 2013, pp. 303-331.
Wissner-Gross, et al., "Causal Entropic Forces," Physical Review Letters, PRL 110, 168702, American Physical Society, Apr. 19, 2013, 5 pages.
International Search Report and Written Opinion for PCT Application No. PCT/US18/66610, dated Apr. 15, 2019, 8 pp.
U.S. Appl. No. 14/595,991—Response to Office Action dated May 10, 2017, filed Nov. 10, 2017, 29 pages.
U.S. Appl. No. 14/595,991—Final Office Action dated Feb. 27, 2018, 25 pages.
U.S. Appl. No. 14/595,991—Response to Final Office Action dated Feb. 27, 2018, filed Jul. 27, 2018, 41 pages.
U.S. Appl. No. 14/595,991—Response to Final Office Action dated Feb. 27, 2018, filed May 22, 2018, 32 pages.
Stanley et al., Why greatness cannot be planned: the myth of the objective, Genet. Program Evolvable Mach.,m 16:559-561, 2015.
U.S. Appl. No. 13/943,630—Office Action dated May 27, 2015, 42 pages.
U.S. Appl. No. 13/945,630—Final Office Action dated Aug. 4, 2015, 22 pages.
U.S. Appl. No. 13/945,630—Resonse to Office Action dated Mar. 12, 2015 filed Jul. 13, 2015, 9 pages.
U.S. Appl. No. 13/358,381—Amendment After Allowance filed Feb. 13, 2015, 20 pages.
U.S. Appl. No. 13/943,630—Response to Office Action dated May 27, 2015 filed Sep. 23, 2015, 8 pages.
U.S. Appl. No. 14/539,908—Office Action dated Oct. 1, 2015, 33 pages.
U.S. Appl. No. 13/945,630—Response to Final Office Action dated Aug. 4, 2015 filed Nov. 4, 2015, 12 pages.
U.S. Appl. No. 13/945,630—Notice of Allowance dated Nov. 18, 2015, 8 pages.
U.S. Appl. No. 13/943,630—Notice of Allwoance dated Jan. 21, 2016, 28 pages.
U.S. Appl. No. 14/539,908—Response to Office Action dated Oct. 1, 2015 filed Feb. 1, 2016, 18 pages.
Deb, et al., "A Fast and Elitist Multiobjective Genetic Algorithm: NSGA II," IEEE Transactions on Evolutionary Computation, vol. 6, No. 2, pp. 182-197, Apr. 2022.
U.S. Appl. No. 13/540,507—Notice of Allowance and Fee(s) Due, dated Oct. 31, 2014, 9 pages.
U.S. Appl. No. 13/540,507—Response filed Oct. 15, 2014, 20 pages.

(56) References Cited

OTHER PUBLICATIONS

U.S. Appl. No. 13/358,381—Notice of Allowance and Fee(s) Due, dated Nov. 19, 2014; 5 pages.
U.S. Appl. No. 13/358,381—Response dated Oct. 3, 2014, 21 pages.
U.S. Appl. No. 13/184,307—Response dated Jun. 23, 2014, 32 pages.
U.S. Appl. No. 13/184,307—Response dated Jan. 22, 2014, 19 pages.
Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.
Hornby, G.S., "A Steady-State Version of the Age-Layered Population Structure EA," Chapter 1 of Genetic Programming Theory and Practice VII, Riolo et al., editors, Springer 2009, 16pp.
Hornby, G.S., "Steady-State ALPS for Real-Valued Problems," GECCO'09, Montreal, Jul. 2009, Assoc. for Computing Machinery, 8pp.
Idesign lab, "ALPS—the Age-Layered Population Structure," UC Santa Cruz web article printed Mar. 17, 2011, 3 pp. (http://idesign.ucsc.edu/projects/alps.html).
Laumanns, Marco et al.; "A Unified Model for Multi-Objective Evolutionary Algorithms with Elitism"; 2000; IEEE; pp. 46-53.
Ahn, Chang Wook et al.; "Elitism-Based Compact Genetic Algorithms"; 2003; IEEE; Transactions on Evolutionary Computation, vol. 7, No. 4; pp. 367-385.
Ducheyne, E. et al., "Is Fitness Inheritance Useful for Real-World Applications?" Evolutionary Multi-Criterion Optimization, ser. LNCS 2631, Spring 2003, pp. 31-42.
Mouret, J.B. et al., "Encouraging Behavioral Diversity in Evolutionary Robotics: An Empirical Study," MIT, Evolutionary Computation 20(1):91-133, 2012.
Refaeilzadeh, P. et al., "Cross Validation" entry, Encyclopedia of Database Systems, eds. Ozsu and Liu, Springer, 2009, 6pp.
U.S. Appl. No. 13/184,307—Office Action dated Oct. 21, 2013, 16 pages.
Hornby, Gregory S.,"The Age-Layered Population Structure (ALPS) Evolutionary Algorithm," ACM; GECCO Jul. 8-12, 2009; 7 pages.
U.S. Appl. No. 13/358,381—Office Action dated Jul. 8, 2014, 18 pages.
Freitas, A., "A review of evolutionary algorithms for data mining." Soft Computing for Knowledge Discovery and Data Mining. Springer US, 2008, pp. 79-111.
U.S. Appl. No. 13/540,507—Office Action dated Sep. 9, 2014, 25 pages.
U.S. Appl. No. 13/184,307—Notice of Allowance dated Aug. 4, 2014, 9 pages.
U.S. Appl. No. 13/184,307—Office Action dated Mar. 21, 2014, 36 pages.
U.S. Appl. No. 13/945,630—Office Action dated Mar. 12, 2015, 18 pages.
Li, Xiaodong, and Michael f{irley. 'The effects of varying population density in a fine-grained parallel genetic algorithmi' Evolutionary Computation. 2002. CEC'02. Proceedings of the 2002 Congress on. vol. 2. IEEE. 2002.
Fidelis. Marcos Vinicius, Heitor S. Lopes, and Alex A. Freitas. "Discovering comprehensible classification rules with a genetic algorithm." Evolutionary Computation. 2000. Proceedings of the 2000 Congress on. vol. 1. IEEE. 2000.
Dec. 23, 2008 International Search Report and Written Opinion for PCT/US2008/82876, 10 pp.
Koza. J.R, "Genetic Programming: On the Programming of Computers by Means of Natural Selection", Dec. 1992, MIT Press. pp. 1-609.
Nov. 26, 2012 Extended EP SR for EP 08847214, 9 pp.
Enee, Gilles et al., "Classifier Systems Evolving Multi-Agent System with Distributed Elitism," Proc. 1999 Congress on Evolutionary Computation (CEC '99) vol. 3:6, Jul. 1999, pp. 1740-1746.

Tanev I et al., "Scalable architecture for parallel distributed implementation of genetic programming on network of workstations," J. Systems Architecture, vol. 47, Jul. 2001, pp. 557-572.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).
Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.
Jun. 16, 2011 Written Opinion from Singapore Patent Office in related application SG 201003127-6, 9 pp.
Apr. 20, 2012 Exam Report for related application AU 2008323758, 2 pp.
Sakauchi et al., "UNIFINE: A Next Generation Financial Solution System of Nihon Unisys Ltd., Technology Review UNISYS," Japan, Nihon Unisys Ltd. , Feb. 28, 2006, vol. 25, No. 4, pp. 14-15.
JP 2010-533295, Office Action dated Apr. 16, 2013, 12 pages.
U.S. Appl. No. 14/014,063—Office Action dated May 7, 2014, 19 pages.
JP 2012-508663—Office Action dated Apr. 1, 2014, 6 pages (with English Translation).
JP 2012-508660—Office Action dated Apr. 1, 2014, 8 pages (with English Translation).
International Search Report mailed Jun. 29, 2010 in PCT/US10/32841.
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.
JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.
E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.
PS Georgilakis, "Genetic Algorithm Model for Profit Maximization of Generating Companies in Deregulated Electricity Markets," Applied Artificial Intelligence, 2009, 23:6,538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incremental Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO-2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," LION 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.

(56) References Cited

OTHER PUBLICATIONS

J Torresen, "A Dynamic Fitness Function Applied to Improve the Generalisation when Evolving a Signal Processing Hardware Architecture," Proc. EvoWorkshops 2002, 267-299 (12 pp).

BA Whitehead, "Genetic Evolution of Radial Basis Function Coverage Using Orthogonal Niches," IEEE Transactions on Neural Networks, 7:6, (1996) 1525-28.

A.S. Wu, et al., "An incremental fitness function for partitioning parallel tasks," Proc. Genetic And Evolutionary Computation Conf., 8 pp., 2001.

Supplementary European Search Report mailed Oct. 12, 2012 in EP 10770288.

Supplementary European Search Report mailed Oct. 9, 2012 in EP 10770287.

Lopez Haimes et al., "MRMOGA: parallel evolutionary multi-objective optimization using multiple resolutions," In: Proceedings of IEEE Congress on Evolutionary Computation, 2294-2301, 2005.

Castillo Tapia et al. Applications of multi-objective evolutionary algorithms in economics and finance: A survey. IEEE Congress on Evolutionary Computation 2007: 532-539.

Bui et al. "Local Models: An Approach to Distributed Multi-objective Optimization, Computational Optimization and Applications," Computational Optimization and Application Journal, 2009, 42(1), 105-139.

Leon et al. Parallel Hypervolume-Guided Hyperheuristic for Adapting the Multi-objective Evolutionary Island Model. NICSO 2008: 261-272.

U.S. Appl. No. 13/895,238—Office Action dated Jan. 2, 2014, 17 pages.

Aug. 1, 2012 Office Action in U.S. Appl. No. 13/443,546, 12 pp.

Jun. 22, 2011 Office Action in U.S. Appl. No. 12/267,287, 16 pp.

Jul. 27, 2012 Final Office Action in U.S. Appl. No. 12/267,287, 14 pp.

AU 2010241594—Examination Report dated Oct. 8, 2013, 3 pages.

AU 2010241597—Examination Report dated Nov. 4, 2013, 4 pages.

Myers, R.H. and Montgomery, D.C., "Response Surface Methodology: Process and Product Optimization Using Designed Experiments," New York: John Wiley and Sons, Inc., 1995, pp. 1-700.

Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.

International Search Report mailed Jul. 2, 2010 in PCT/US10/32847.

U.S. Appl. No. 15/794,913—Non-Provisional Application filed Oct. 26, 2017, 73 pages.

Stanley, Kenneth O., et al., "Real-Time Evolution of Neural Networks in the Nero Video Game," AAAI, vol. 6, 2006, 4 pp.

Scott, E. O., et al., "Understanding Simple Asynchronous Evolutionary Algorithms," Jan. 17-20, 2015, 15 pp.

Kenneth O. Stanley and Risto Miikkulainen, "Evolving Neural Networks Through Augmenting Topologies," Evolutionary Computation, 10(2):99-127, 2002.

International Search Report and Written Opinion for PCT Application No. PCT/US18/64428, dated Mar. 26, 2019, 12 pp.

International Search Report and Written Opinion for Application No. PCT/US2018/064520, dated Mar. 4, 2019, 8 pp.

Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent.cgi?article=1751&context=ele_comeng_facwork.

N. Garcia-Pedrajas, et al., "Cooperative Coevolution of Artificial Neural Nedtwork Ensembles for Pattern Classification," IEEE Transactions on Evolutionary Computation, vol. 9, No. 3, Jun. 2005, 32 pp.

Snoek, et al., "Scalable Bayesian Optimization Using Deep Neural Networks", 2015, 13 pages.

Fernando et al., "Pathnet: Evolution channels gradient descent in super neural networks," arXiv preprint arXiv:1701.08734 (2017), 16 pages.

Yang et al., "Deep multi-task representation learning: A tensor factorisation approach," arXiv preprint arXiv:1605.06391 (2016), 12 pages.

Shazeer et al., "Outrageously large neural networks: The sparsely-gated mixture-of-experts layer," arXiv preprint arXiv:1701.06538 (2017), 19 pages.

Misra et al., "Cross-stitch networks for multi-task learning," In Proceedings of the IEEE Conference on Computer Vision and Pattern Recognition, pp. 3994-4003. 2016.

\* cited by examiner

Algorithm 1 PTA Training Framework

1: Given $T$ tasks $\{\{x_{t,i}, y_{t,i}\}_{i=1}^{N_t}\}_{t=1}^{T}$, and $D$ decoders per task
2: $\{\{\theta_{\mathcal{D}_{t,d}}\}_{d=1}^{D}\}_{t=1}^{T} \leftarrow DecInitialize()$
3: Initialize $\theta_{\mathcal{F}}$
4: Initialize decoder costs $c_{t,d} \leftarrow \infty \; \forall \, (t,d)$
5: while not done training do
6:   for $m = 1$ to $M$ do    ▷ $M$ is meta-iteration length
7:     Update $\theta_{\mathcal{F}}$ and $\theta_{\mathcal{D}_{t,d}}$ via a joint gradient step.
8:   for $t = 1$ to $T$ do
9:     for $d = 1$ to $D$ do
10:       $c_{t,d} \leftarrow evaluate(\theta_{\mathcal{D}_{t,d}}, \theta_{\mathcal{F}}, t)$    ▷ e.g., get validation error
11:   for $d = 1$ to $D$ do
12:     $\theta_{\mathcal{D}_{t,d}} \leftarrow DecUpdate(d, \{\theta_{\mathcal{D}_{t,d_o}}, c_{t,d_o}\}_{d_o=1}^{D})$
13: return $(\{\{\theta_{\mathcal{D}_{t,d}}\}_{d=1}^{D}\}_{t=1}^{T}, \theta_{\mathcal{F}})$

Figure 7

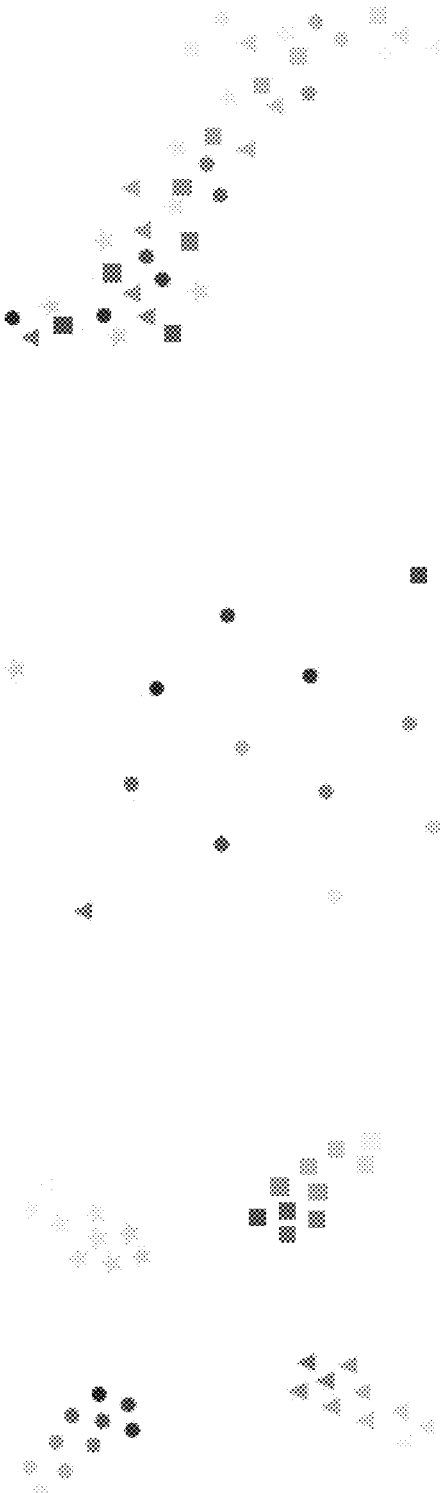
Figure 9 (a) PTA-I  Figure 9 (b) PTA-F  Figure 9 (c) PTA-HGD

SYSTEM AND METHOD FOR PSEUDO-TASK AUGMENTATION IN DEEP MULTITASK LEARNING

CROSS-REFERENCE TO RELATED APPLICATIONS

The present application claims benefit and right of priority U.S. Provisional Patent Application No. 62/628,248, titled "PSEUDO-TASK AUGMENTATION: FROM DEEP MULTITASK LEARNING TO INTRATASK SHARING AND BACK", filed on Feb. 8, 2018 and U.S. Provisional Patent Application No. 62/684,125, titled "PSEUDO-TASK AUGMENTATION: FROM DEEP MULTITASK LEARNING TO INTRATASK SHARING AND BACK", filed on Jun. 12, 2018, both of which are incorporated herein by reference in their entireties.

The following documents are incorporated herein by reference in their entireties: E. Meyerson and R. Miikkulainen, 2018, Pseudo-Task Augmentation: From Deep Multitask Learning to Intratask Sharing and Back, ICML (2018); J. Z. Liang, E. Meyerson, and R. Miikkulainen, 2018, Evolutionary Architecture Search For Deep Multitask Networks, GECCO (2018); E. Meyerson and R. Miikkulainen, 2018, Beyond Shared Hierarchies: Deep Multitask Learning through Soft Layer Ordering, ICLR (2018); U.S. Provisional Patent Application No. 62/578,035, titled "DEEP MULTITASK LEARNING THROUGH SOFT LAYER ORDERING", filed on Oct. 27, 2017 and U.S. Nonprovisional patent application Ser. No. 16/172,660, titled "BEYOND SHARED HIERARCHIES: DEEP MULTITASK LEARNING THROUGH SOFT LAYER ORDERING", files on Oct. 26, 2018; R. Miikkulainen, J. Liang, E. Meyerson, et al., 2017, Evolving deep neural networks, arXiv preprint arXiv: 1703.00548 (2017); U.S. Nonprovisional patent application Ser. No. 15/794,905, titled "EVOLUTION OF DEEP NEURAL NETWORK STRUCTURES", filed on Oct. 26, 2017; and U.S. Nonprovisional patent application Ser. No. 15/794,913, titled "COOPERATIVE EVOLUTION OF DEEP NEURAL NETWORK STRUCTURES", filed on Oct. 26, 2017.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep neural networks such as convolutional neural networks (CNNs) and fully-connected neural networks (FCNNs) for analyzing data.

SUMMARY OF THE EMBODIMENTS

In a first embodiment, a neural network-based model coupled to memory and running on one or more parallel processors, comprising: an encoder that processes an input and generates an encoding; numerous decoders that are grouped into sets of decoders in dependence upon corresponding classification tasks, that respectively receive the encoding as input from the encoder, thereby forming encoder-decoder pairs which operate independently of each other when performing the corresponding classification tasks, and that respectively process the encoding and produce classification scores for classes defined for the corresponding classification tasks; and a trainer that jointly trains the encoder-decoder pairs over one thousand to millions of backpropagation iterations to perform the corresponding classification tasks.

In a second exemplary embodiment, a neural network-implemented method, includes: processing an input through an encoder and generating an encoding; processing the encoding through numerous decoders and producing classification scores for classes defined for corresponding classification tasks, wherein the decoders are grouped into sets of decoders in dependence upon the corresponding classification tasks and respectively receive the encoding as input from the encoder, thereby forming encoder-decoder pairs which operate independently of each other; and jointly training the encoder-decoder pairs over one thousand to millions of backpropagation iterations to perform the corresponding classification tasks.

In a third exemplary embodiment, a non-transitory computer readable storage medium impressed with computer program instructions, which, when executed on a processor, implement a method comprising: processing an input through an encoder and generating an encoding; processing the encoding through numerous decoders and producing classification scores for classes defined for corresponding classification tasks, wherein the decoders are grouped into sets of decoders in dependence upon the corresponding classification tasks and respectively receive the encoding as input from the encoder, thereby forming encoder-decoder pairs which operate independently of each other; and jointly training the encoder-decoder pairs over one thousand to millions of backpropagation iterations to perform the corresponding classification tasks.

In a fourth exemplary embodiment, a pseudo-task augmentation system includes: an underlying multitask model that embeds task inputs into task embeddings; a plurality of decoder models that project the task embeddings into distinct classification layers; wherein a combination of the multitask model and a decoder model in the plurality of decoder models defines a task model, and a plurality of task models populate a model space; and a traverser that traverses a model space and determines a distinct loss for each task model in the model based on a distinct gradient during training.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 7 is an algorithm giving a high-level framework for applying explicit control to pseudo-task trajectories.

FIGS. 9*a*, 9*b* and 9*c* illustrate projections of pseudo-task trajectories, for runs of PTA-I, PTA-F, and PTA-HGD on IMDB.

DESCRIPTION

Figure 1:
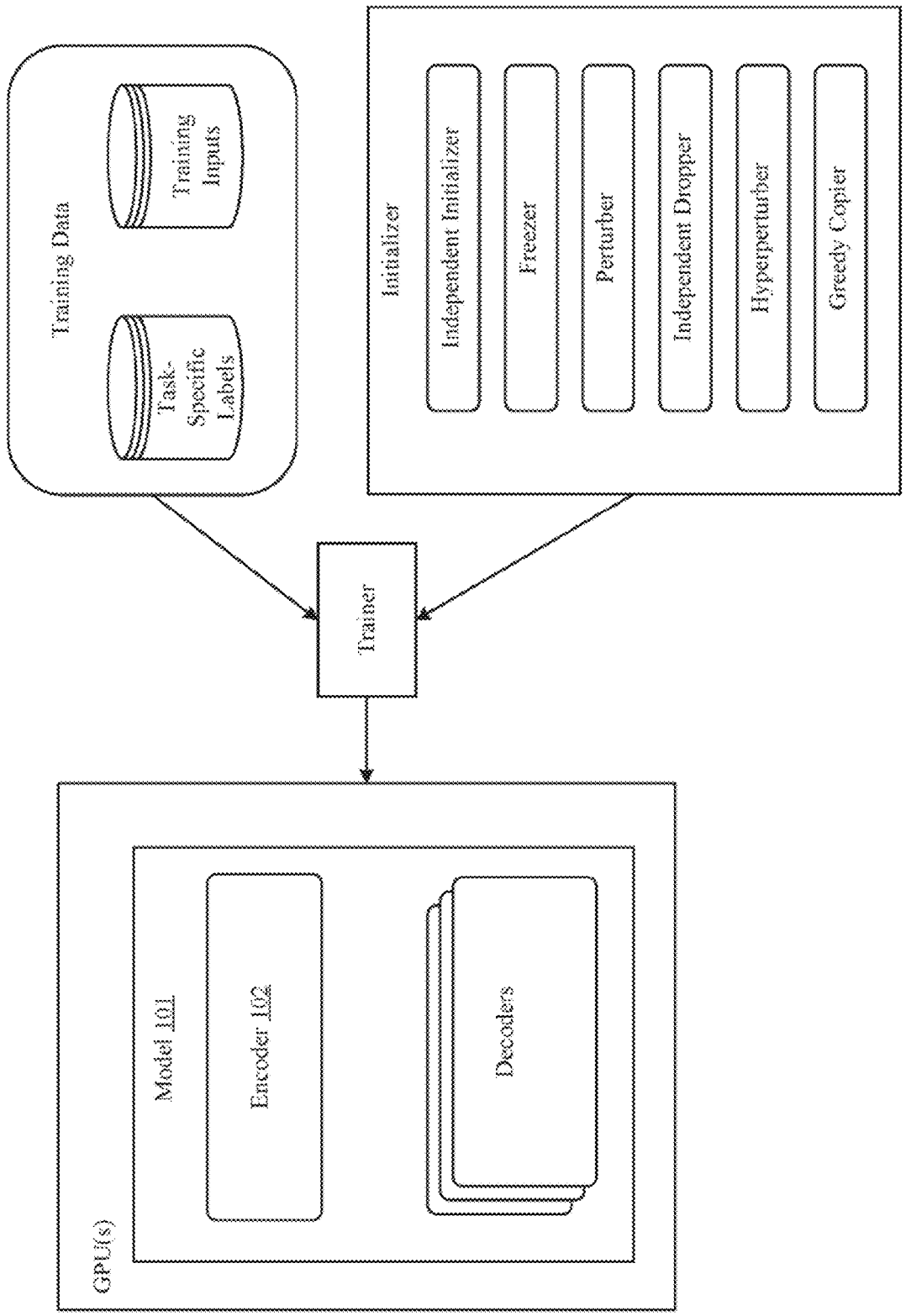
FIG. 1 is a block diagram that shows various aspects of the technology disclosed, including a model with an encoder and numerous decoders, training data, a trainer, and an initializer.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

System

FIG. 1 is a block diagram 100 that shows various aspects of the technology disclosed, including a model 101 with an encoder 102 and numerous decoders, training data, a trainer, and an initializer.

Encoder 102 is a processor that receives information characterizing input data and generates an alternative representation and/or characterization of the input data, such as an encoding. In particular, encoder 102 is a neural network such as a convolutional neural network (CNN), a multilayer perceptron, a feed-forward neural network, a recursive neural network, a recurrent neural network (RNN), a deep neural network, a shallow neural network, a fully-connected neural network, a sparsely-connected neural network, a convolutional neural network that comprises a fully-connected neural network (FCNN), a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on.

In implementations, encoder 102 includes individual components of a convolutional neural network (CNN), such as a one-dimensional (1D) convolution layer, a two-dimensional (2D) convolution layer, a three-dimensional (3D) convolution layer, a feature extraction layer, a dimensionality reduction layer, a pooling encoder layer, a subsampling layer, a batch normalization layer, a concatenation layer, a classification layer, a regularization layer, and so on.

In implementations, encoder 102 comprises learnable components, parameters, and hyperparameters that can be trained by backpropagating errors using an optimization algorithm. The optimization algorithm can be based on stochastic gradient descent (or other variations of gradient descent like batch gradient descent and mini-batch gradient descent). Some examples of optimization algorithms that can be used to train the encoder 102 are Momentum, Nesterov accelerated gradient, Adagrad, Adadelta, RMSprop, and Adam.

In implementations, encoder 102 includes an activation component that applies a non-linearity function. Some examples of non-linearity functions that can be used by the encoder 102 include a sigmoid function, rectified linear units (ReLUs), hyperbolic tangent function, absolute of hyperbolic tangent function, leaky ReLUs (LReLUs), and parametrized ReLUs (PReLUs).

In some implementations, encoder 102 can include a classification component, though it is not necessary. In preferred implementations, encoder 102 is a convolutional neural network (CNN) without a classification layer such as softmax or sigmoid. Some examples of classifiers that can be used by the encoder 102 include a multi-class support vector machine (SVM), a sigmoid classifier, a softmax classifier, and a multinomial logistic regressor. Other examples of classifiers that can be used by the encoder 102 include a rule-based classifier.

Some examples of the encoder 102 are:
AlexNet
ResNet
Inception (various versions)
WaveNet
PixelCNN
GoogLeNet
ENet
U-Net BN-NIN
VGG
LeNet
DeepSEA
DeepChem
DeepBind
DeepMotif
FIDDLE
DeepLNC
DeepCpG
DeepCyTOF
SPINDLE In model 101, the encoder 102 produces an output, referred to herein as "encoding", which is fed as input to each of the decoders. When the encoder 102 is a convolutional neural network (CNN), the encoding is convolution data. When the encoder 102 is a recurrent neural network (RNN), the encoding is hidden state data.

Each decoder is a processor that receives, from the encoder 102, information characterizing input data (such as the encoding) and generates an alternative representation and/or characterization of the input data, such as classification scores. In particular, each decoder is a neural network such as a convolutional neural network (CNN), a multilayer perceptron, a feed-forward neural network, a recursive neural network, a recurrent neural network (RNN), a deep neural network, a shallow neural network, a fully-connected neural network, a sparsely-connected neural network, a convolutional neural network that comprises a fully-connected neural network (FCNN), a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on.

In implementations, each decoder includes individual components of a convolutional neural network (CNN), such as a one-dimensional (1D) convolution layer, a two-dimensional (2D) convolution layer, a three-dimensional (3D) convolution layer, a feature extraction layer, a dimensionality reduction layer, a pooling encoder layer, a subsampling layer, a batch normalization layer, a concatenation layer, a classification layer, a regularization layer, and so on.

In implementations, each decoder comprises learnable components, parameters, and hyperparameters that can be trained by backpropagating errors using an optimization algorithm. The optimization algorithm can be based on stochastic gradient descent (or other variations of gradient descent like batch gradient descent and mini-batch gradient descent). Some examples of optimization algorithms that can be used to train each decoder are Momentum, Nesterov accelerated gradient, Adagrad, Adadelta, RMSprop, and Adam.

In implementations, each decoder includes an activation component that applies a non-linearity function. Some examples of non-linearity functions that can be used by each decoder include a sigmoid function, rectified linear units (ReLUs), hyperbolic tangent function, absolute of hyperbolic tangent function, leaky ReLUs (LReLUs), and parametrized ReLUs (PReLUs).

In implementations, each decoder includes a classification component. Some examples of classifiers that can be used by each decoder include a multi-class support vector machine (SVM), a sigmoid classifier, a softmax classifier, and a multinomial logistic regressor. Other examples of classifiers that can be used by each decoder include a rule-based classifier.

The numerous decoders can all be the same type of neural networks with matching architectures, such as fully-connected neural networks (FCNN) with an ultimate sigmoid or softmax classification layer. In other implementations, they can differ based on the type of the neural networks. In yet other implementations, they can all be the same type of neural networks with different architectures.

Joint Training

Figure 2:
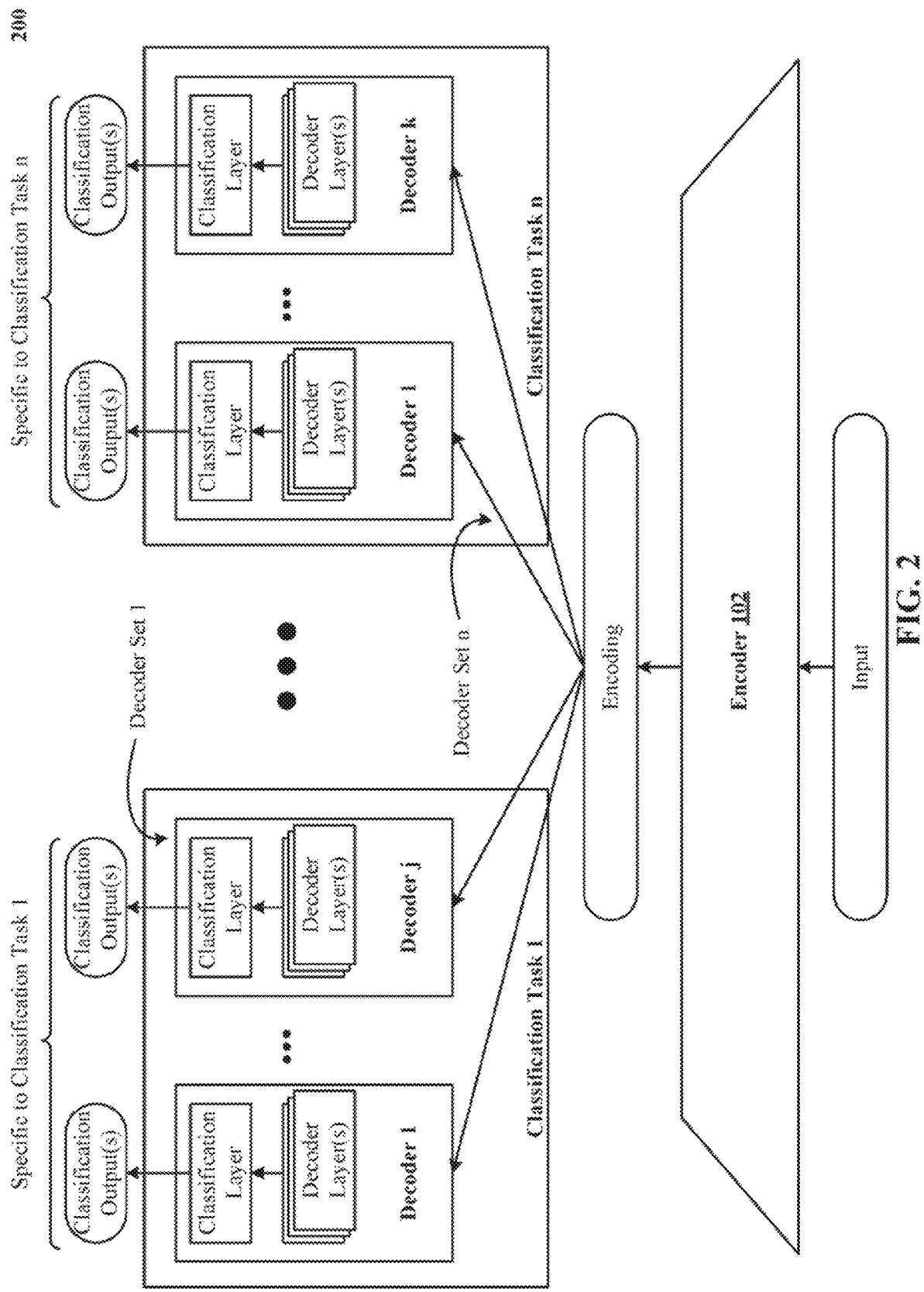
FIG. 2 illustrates one implementation of jointly training encoder-decoder pairs on corresponding classification tasks.

FIG. 2 illustrates one implementation of jointly training 200 encoder-decoder pairs on corresponding classification tasks. FIG. 2 also shows how model 101 includes multiple processing pipeline in which an input (such as an image) is first processed through the encoder 102 to generate the encoding, and the encoding is then separately fed as input to each of the different decoders. This way, numerous encoder-decoder pairs are formed; all of which have the same underlying encoder 102.

Note that the processing through the same underlying encoder 102 to produce the encoding occurs only once during a given forward pass step; however, multiple processing steps occur independently and concurrently in each of the different decoders during the given forward pass step to produce respective classification outputs, as discussed below.

Similarly, multiple processing steps occur independently and concurrently in each of the different decoders during a given backward pass step, as discussed below.

As used herein, "concurrently" or "in parallel" does not require exact simultaneity. It is sufficient if the processing of one of the decoders begins before the processing of another of the decoder completes.

FIG. 2 further shows that the numerous decoders are grouped into sets of decoders (or decoder sets) in dependence upon corresponding classification tasks. Consider that the model 101 has a total of 400 decoders and there are 40 classification tasks to be performed, then groups of 10 decoders can be grouped in 40 decoder sets such decoders in the same decoder set perform the same classification task; of course in conjunction with the same underlying encoder 102. In other implementations, the number of grouped decoders can vary from decoder set to decoder set.

Regarding the classification tasks, they can be distinct and/or related. For example, each classification task can be to predict a different facial attribute in the same image such as age, bags under eye, full lips, smiling, prominent nose, blonde hair, bald, wavy hair, goatee, mustache, full face, large chin, lipstick, and eyeglasses. In such a case, a single image, annotated with numerous ground truths corresponding to the respective classification task, can be fed as input to the encoder 102 and the performance of the model 101 can be determined accordingly by computing an error using a loss function. In another implementation, each classification task can be to predict a different alphabet letter from among the twenty-seven alphabet letters or to predict a different numerical digit from among the ten numeric digits. In such cases, twenty-seven images or ten images, each annotated with a single ground truth corresponding to a respective alphabet letter or numerical digit, can be fed in parallel as input to the encoder 102 during a single forward pass iteration and the performance of the model 101 can determined accordingly by computing an error using a loss function. In yet other implementations, the classification tasks can be different natural language processing tasks such as part-of-speech (POS) tagging, chunking, dependency parsing, and sentiment analysis.

It is important to note that even though different decoder sets perform different classification tasks and decoders in the same decoder set perform the same classification task, each of the decoders operates independently of each other but in conjunction with the same underlying encoder 102. Turning to FIG. 2 again, consider that classification task 1 is to evaluate an input image and predict the age of the person in the image and classification task n is to evaluate the same image and predict whether the person in the image is wearing eyeglasses.

Now, as illustrated, decoders 1 and j in the decoder set 1 will separately receive the encoding from the encoder 102 and process it through their respective decoder layers and classification layers and generate separate classification outputs on the likely age of the person in the image. The classification outputs are specific to the classification task 1 being performed by the decoders 1 and j in the decoder set 1. In other words, they are specific to the classes defined for the classification task 1 being performed by the decoders 1 and j in the decoder set 1 (e.g., a young class and an old class or a softmax distribution between 1 year and 100 years or a sigmoid value between 0 and 1 with 0 representing young and 1 representing old).

Thus, even though decoders 1 and j in the decoder set 1 performed the same classification task 1, they performed it independently of each other or of any other decoder in the model 101. As a result, the forward propagation and the backward propagation also occurs separately and independently in the decoders 1 and j (and all other decoders in general).

Decoders 1 and k in the decoder set n operate in parallel to, concurrently, or simultaneously to decoders 1 and j in the decoder set 1, but, independently and in conjunction with the same underlying encoder 102, to perform a different classification task n of predicting whether the person in the image is wearing eyeglasses.

Now, as illustrated, decoders 1 and k in the decoder set n will separately receive the encoding from the encoder 102 and process it through their respective decoder layers and classification layers and generate separate classification outputs on whether the person in the image is wearing eyeglasses. The classification outputs are specific to the classification task n being performed by the decoders 1 and k in the decoder set n. In other words, they are specific to the classes defined for the classification task n being performed by the decoders 1 and k in the decoder set n (e.g., an eyeglasses class and a no eyeglasses class).

Forward Propagation

Figure 3:
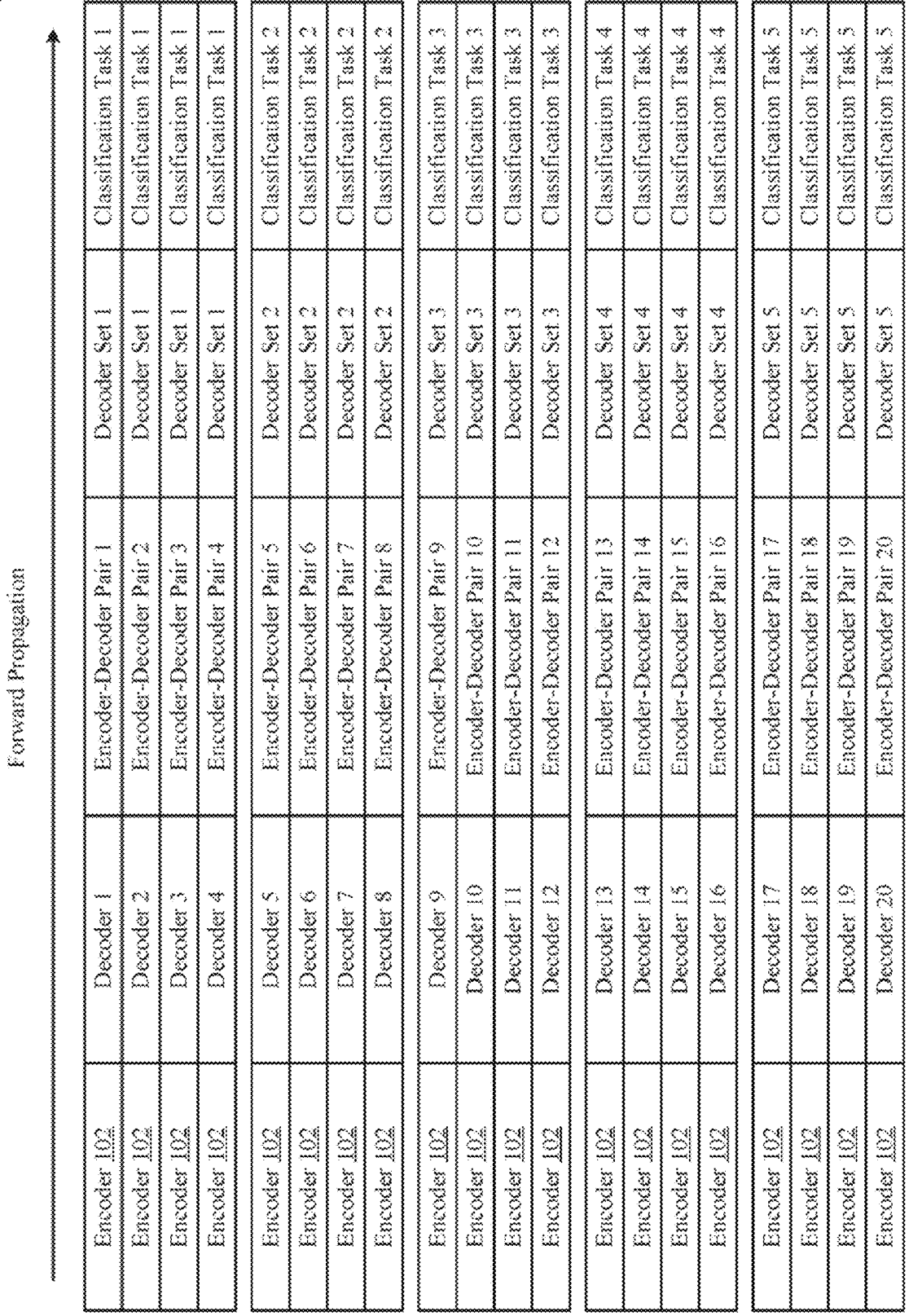
FIG. 3 depicts one forward propagation implementation of the encoder-decoder pairs operating independently of each other when performing the corresponding classification tasks.

FIG. 3 depicts one forward propagation implementation of the encoder-decoder pairs 1-20 operating 300 independently of each other when performing the corresponding classification tasks 1-5. In FIG. 3, as a way of example, twenty encoder-decoder pairs, each with the same underlying encoder 102 but a different decoder perform corresponding classification tasks 1, 2, 3, 4, or 5. Note that multiple decoders that are grouped in the same decoder set independently perform the same classification task. Also, decoders that are grouped in different decoder sets independently perform different classification tasks.

Backward Propagation

Figure 4:
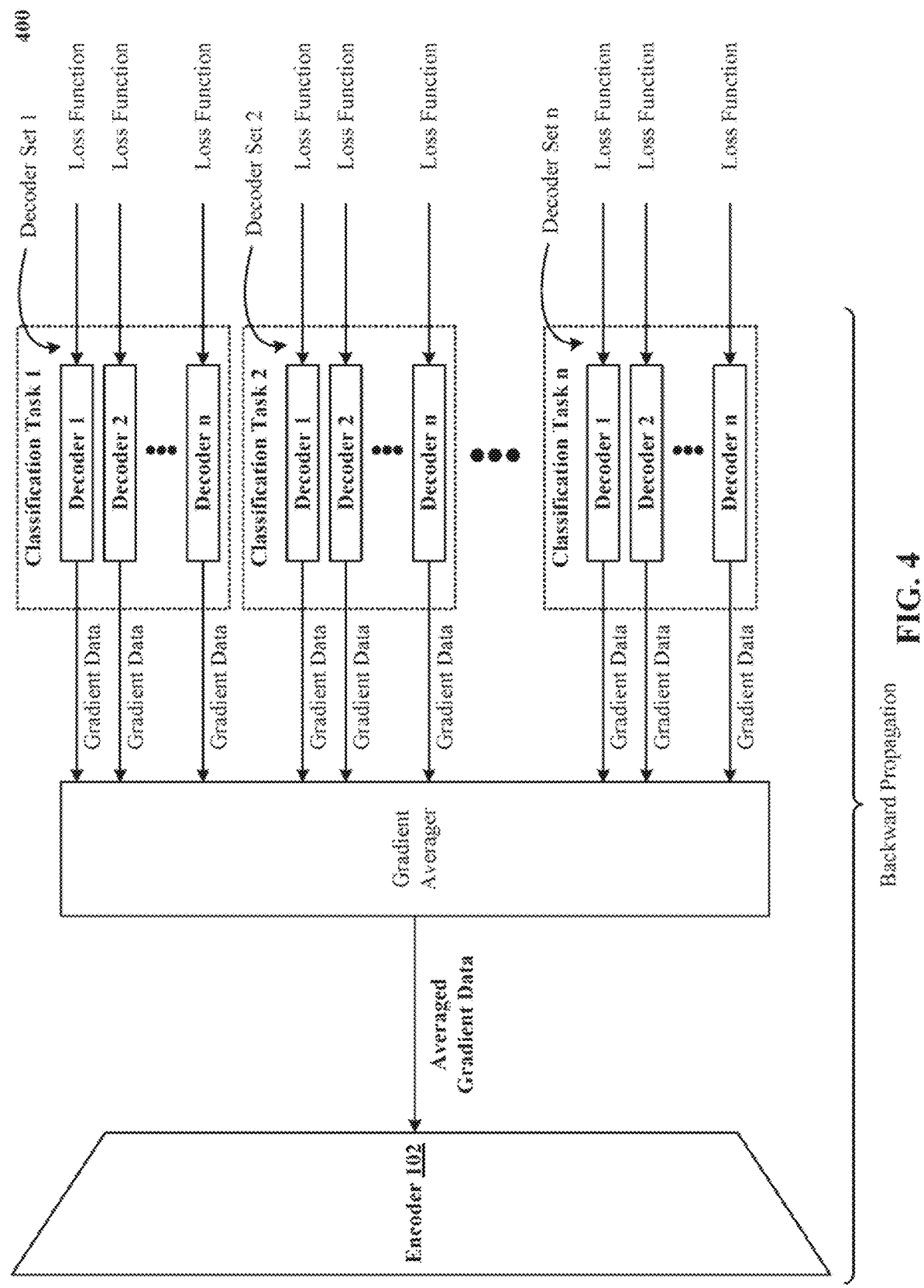
FIG. 4 illustrates one backward propagation implementation of modifying weights of the encoder by backpropagating through the encoder in dependence upon averaged gradient data determined for the decoders.

FIG. 4 illustrates one backward propagation implementation of modifying weights of the encoder by backpropagating 400 through the encoder 102 in dependence upon averaged gradient data determined for the decoders. For each of one thousand to millions of backpropagation iterations complemented by forward pass evaluation of training examples, gradient data for each of the decoders is determined in dependence upon a loss function. A gradient averager, shown in FIG. 4, averages the gradient data determined for the decoders.

The averaged gradient data is then backpropagated through the encoder 102 to determine gradient data for the encoder 102. Weights of the encoder 102 are then updated in dependence upon the gradient data determined for the encoder 102.

Receiving an average of gradients from decoders that are configured to perform different classification tasks trains the encoder 102 to generate an encoding that is suitable for a variety of classification tasks. In other words, encoder 102 becomes better at generating an encoding that generalizes for a wider range or pool of classification tasks. This makes encoder 102 more robust to feature diversity typically seen in real-world data.

Computer System

Figure 5:
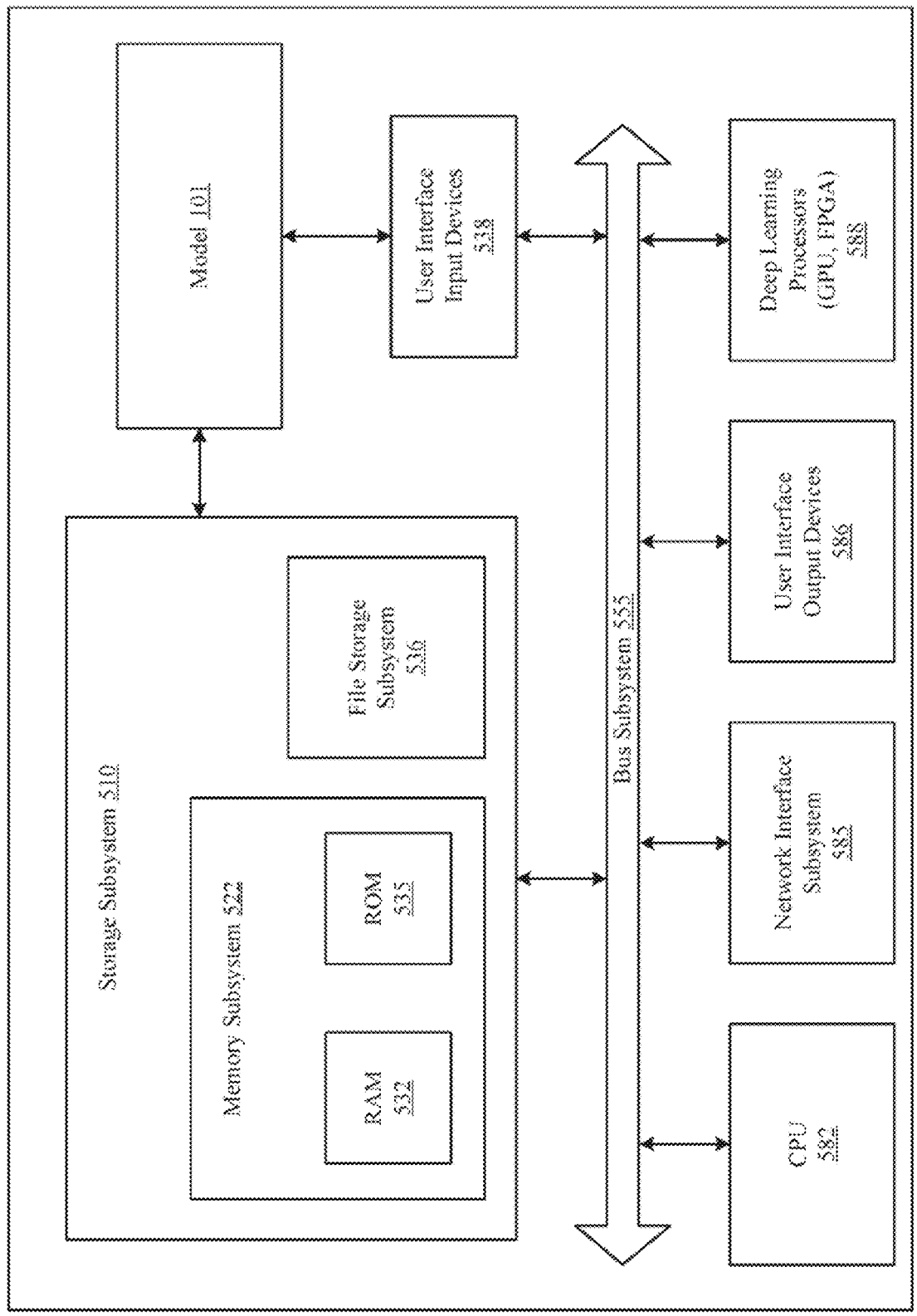
FIG. 5 is a simplified block diagram of a computer system that can be used to implement the technology disclosed.

FIG. 5 is a simplified block diagram of a computer system 500 that can be used to implement the technology disclosed. Computer system 500 includes at least one central processing unit (CPU) 582 that communicates with a number of peripheral devices via bus subsystem 555. These peripheral devices can include a storage subsystem 510 including, for example, memory devices 522 and a file storage subsystem 536, user interface input devices 538, user interface output devices 586, and a network interface subsystem 585. The input and output devices allow user interaction with computer system 500. Network interface subsystem 585 provides an interface to outside networks, including an interface to corresponding interface devices in other computer systems.

In one implementation, the model 101 is communicably linked to the storage subsystem 510 and the user interface input devices 538.

User interface input devices 538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 500.

User interface output devices 586 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 500 to the user or to another machine or computer system.

Storage subsystem 510 stores programming and data constructs that provide the functionality of some or all of the modules and methods described herein. Subsystem 588 can be graphics processing units (GPUs) or field-programmable gate arrays (FPGAs).

Memory subsystem 522 used in the storage subsystem 510 can include a number of memories including a main random access memory (RAM) 532 for storage of instructions and data during program execution and a read only memory (ROM) 535 in which fixed instructions are stored. A file storage subsystem 536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 536 in the storage subsystem 510, or in other machines accessible by the processor.

Bus subsystem 555 provides a mechanism for letting the various components and subsystems of computer system 500 communicate with each other as intended. Although bus subsystem 555 is shown schematically as a single bus, alternative implementations of the bus subsystem can use multiple busses.

Computer system 500 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 500 depicted in FIG. 5 is intended only as a specific example for purposes of illustrating the preferred embodiments of the present invention. Many other configurations of computer system 500 are possible having more or less components than the computer system depicted in FIG. 5.

Particular Implementations

In one implementation, we describe a system and various implementations of multi-task (MTL) learning using an encoder-decoders architecture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation, the technology disclosed presents a neural network-based model. The model is coupled to memory and runs on one or more parallel processors.

The model has an encoder that processes an input and generates an encoding.

The model has numerous decoders. The decoders are grouped into sets of decoders in dependence upon corresponding classification tasks. The decoders respectively receive the encoding as input from the encoder, thereby forming encoder-decoder pairs which operate independently of each other when performing the corresponding classification tasks. The decoders respectively process the encoding and produce classification scores for classes defined for the corresponding classification tasks.

A trainer jointly trains the encoder-decoder pairs over one thousand to millions of backpropagation iterations to perform the corresponding classification tasks.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The trainer is further configured to comprise a forward pass stage that processes training inputs through the encoder and resulting encodings through the decoders to compute respective activations for each of the training inputs, a backward pass stage, that, over each of the one thousand to millions of backpropagation iterations, determines gradient data for the decoders for each of the training inputs in dependence upon a loss function, averages the gradient data determined for the decoders, and determines gradient data for the encoder by backpropagating the averaged gradient data through the encoder, an update stage that modifies weights of the encoder in dependence upon the gradient data determined for the encoder, and a persistence stage that, upon convergence after a final backpropagation iteration, persists in the memory the modified weights of the encoder derived by the training to be applied to future classification tasks.

The model is further configured to use a combination of the modified weights of the encoder derived by the training and modified weights of a particular one of the decoders derived by the training to perform a particular one of the classification tasks on inference inputs. The inference inputs are processed by the encoder to produce encodings, followed by the particular one of the decoders processing the encodings to output classification scores for classes defined for the particular one of the classification tasks.

The model is further configured to use a combination of the modified weights of the encoder derived by the training and modified weights of two or more of the decoders derived by the training to respectively perform two or more of the classification tasks on inference inputs. The inference inputs are processed by the encoder to produce encodings, followed by the two or more of the decoders respectively processing the encodings to output classification scores for classes defined for the two or more of the classification tasks.

Each training input is annotated with a plurality of task-specific labels for the corresponding classification tasks. A plurality of training inputs for the corresponding classification tasks are fed in parallel to the encoder as input in each forward pass iteration. Each training input is annotated with a task-specific label for a corresponding classification task.

The loss function is cross entropy that uses either a maximum likelihood objective function, a policy gradient function, or both.

The encoder is a convolutional neural network (abbreviated CNN) with a plurality of convolution layers arranged in a sequence from lowest to highest. The encoding is convolution data.

Each decoder further comprises at least one decoder layer and at least one classification layer. The decoder is a fully-connected neural network (abbreviated FCNN) and the decoder layer is a fully-connected layer. The classification layer is a sigmoid classifier. The classification layer is a softmax classifier.

The encoder is a recurrent neural network (abbreviated RNN), including long short-term memory (LSTM) network or gated recurrent unit (GRU) network. The encoding is hidden state data. The encoder is a fully-connected neural network (abbreviated FCNN) with at least one fully-connected layer.

Each decoder is a recurrent neural network (abbreviated RNN), including long short-term memory (LSTM) network or gated recurrent unit (GRU) network. Each decoder is a convolutional neural network (abbreviated CNN) with a plurality of convolution layers arranged in a sequence from lowest to highest.

At least some of the decoders are of a first neural network type, at least some of the decoders are of a second neural network type, and at least some of the decoders are of a third neural network type. At least some of the decoders are convolutional neural networks (abbreviated CNNs) with a plurality of convolution layers arranged in a sequence from lowest to highest, at least some of the decoders are recurrent neural networks (abbreviated RNNs), including long short-term memory (LSTM) networks or gated recurrent unit (GRU) networks, and at least some of the decoders are fully-connected neural networks (abbreviated FCNNs).

The input, the training inputs, and the inference inputs are image data. The input, the training inputs, and the inference inputs are text data. The input, the training inputs, and the inference inputs are genomic data.

The model is further configured to comprise an independent initializer that initializes the decoders with random weights.

The model is further configured to comprise a freezer that freezes weights of some decoders for certain number of backpropagation iterations while updating weights of at least one high performing decoder among the decoders over the certain number of backpropagation iterations. The high performing decoder is identified based on performance on validation data.

The model is further configured to comprise a perturber that periodically perturbs weights of the decoders after certain number of backpropagation iterations by adding random noise to the weights.

The model is further configured to comprise an independent dropper that periodically and randomly drops out weights of the decoders after certain number of backpropagation iterations.

The model is further configured to comprise a hyperperturber that periodically perturbs hyperparameters of the decoders after certain number of backpropagation iterations by randomly changing a rate at which weights of the decoders are randomly dropped out.

The model is further configured to comprise a greedy coper that identifies at least one high performing decoder among the decoders after every certain number of backpropagation iterations and copies weights and hyperparameters of the high performing decoder to the other decoders. The high performing decoder is identified based on performance on validation data.

Other implementations may include a non-transitory computer readable storage medium storing instructions executable by a processor to perform actions of the system described above. Each of the features discussed in the particular implementation section for other implementations apply equally to this implementation. As indicated above, all the other features are not repeated here and should be considered repeated by reference.

In one implementation, the technology disclosed presents a neural network-implemented method.

The method includes processing an input through an encoder and generating an encoding.

The method includes processing the encoding through numerous decoders and producing classification scores for classes defined for corresponding classification tasks. The decoders are grouped into sets of decoders in dependence upon the corresponding classification tasks and respectively receive the encoding as input from the encoder, thereby forming encoder-decoder pairs which operate independently of each other.

The method includes jointly training the encoder-decoder pairs over one thousand to millions of backpropagation iterations to perform the corresponding classification tasks.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above. Each of the features discussed in the particular implementation section for other implementations apply equally to this implementation. As indicated above, all the other features are not repeated here and should be considered repeated by reference.

In another implementation, the multi-task (MTL) process is adapted to the single-task learning (STL) case, i.e., when only a single task is available for training. The method is formalized as pseudo-task augmentation (PTA), in which a single task has multiple distinct decoders projecting the output of the shared structure to task predictions. By training the shared structure to solve the same problem in multiple ways, PTA simulates the effect of training towards distinct but closely-related tasks drawn from the same universe. Theoretical justification shows how training dynamics with multiple pseudo-tasks strictly subsumes training with just one, and a class of algorithms is introduced for controlling pseudo-tasks in practice.

In an array of experiments discussed further herein, PTA is shown to significantly improve performance in single-task settings. Although different variants of PTA traverse the space of pseudo-tasks in qualitatively different ways, they all demonstrate substantial gains. As discussed below, experiments also show that when PTA is combined with MTL, further improvements are achieved, including state-of-the-art performance on the CelebA dataset. In other words, although PTA can be seen as a base case of MTL, PTA and MTL have complementary value in learning more generalizable models. The conclusion is that pseudo-task augmentation is an efficient, reliable, and broadly applicable method for boosting performance in deep learning systems.

The following method combines the benefits of the joint training of models for multiple tasks and separate training of multiple models for single tasks to train multiple models that share underlying parameters and sample complementary high-performing areas of the model space to improve single task performance. In this description, first, the classical deep MTL approach is extended to the case of multiple decoders per task. Then, the concept of a pseudo-task is introduced, and increased training dynamics under multiple pseudo-tasks is demonstrated. Finally, practical methods for controlling pseudo-tasks during training are described and compared empirically.

The most common approach to deep MTL is still the "classical" approach, in which all layers are shared across all tasks up to a high level, after which each task learns a distinct decoder that maps high-level points to its task-specific output space. Even when more sophisticated methods are developed, the classical approach is often used as a baseline for comparison. The classical approach is also computationally efficient, in that the only additional parameters beyond a single task model are in the additional decoders. Thus, when applying ideas from deep MTL to single-task multi-model learning, the classical approach is a natural starting point. Consider the case where there are T distinct true tasks, but now let there be D decoders for each task. Then, the model for the dth decoder of the tth task is given by (Eq. 1):

$$\hat{y}_{tdi} = \mathcal{D}_{td}(\mathcal{F}(x_{ti}; \theta \mathcal{F}); \theta \mathcal{D}_{td}),$$

Figure 6:
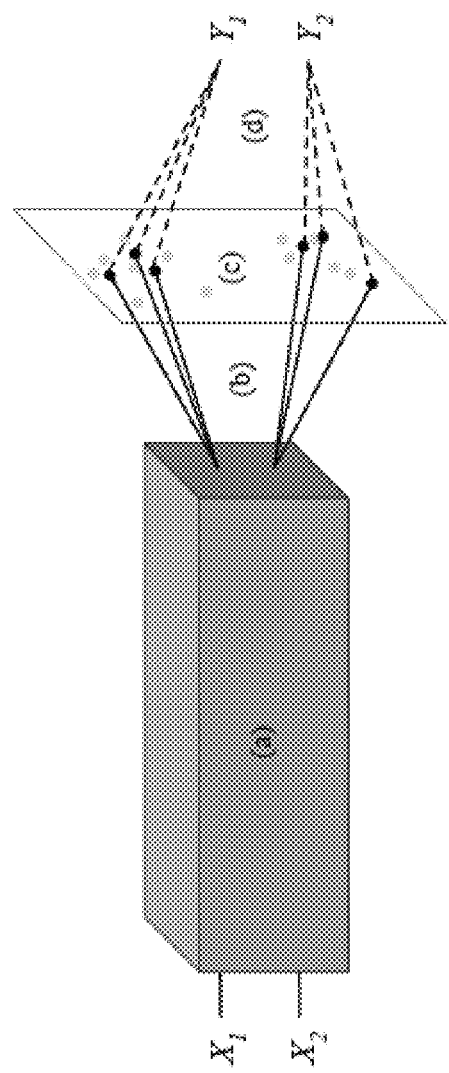
FIG. 6 is an exemplary underlying model set-up for pseudo-task augmentation with two tasks.

In which a joint model is decomposed into an underlying model F (parameterized by θF) that is shared across all tasks, and task-specific decoders $D_t$ (parameterized by $\theta_{Dt}$) for each task. And the overall loss for the joint model is given by (Eq. 2):

$$\theta^* = \underset{\theta}{\mathrm{argmin}} \frac{1}{TD} \sum_{t=1}^{T} \frac{1}{N_t} \sum_{i=1}^{N_t} \sum_{d=1}^{D} \mathcal{L}(y_{ti}, \hat{y}_{tdi}),$$

where $\theta = (\{\{\theta_{\mathcal{D}_{td}}\}_{d=1}^{D}\}_{t=1}^{T}, \theta_{\mathcal{F}})$. In the same way as the classical approach to MTL encourages F to be more general and robust by requiring it to support multiple tasks, here F is required to support solving the same task in multiple ways. A visualization of a resulting joint model is shown in FIG. 6 which illustrates a general setup for pseudo-task augmentation with two tasks. In FIG. 6 (a) is the underlying model wherein all task inputs are embedded through an underlying model that is completely shared; (b) shows multiple decoders, wherein each task has multiple decoders (solid black lines) each projecting the embedding to a distinct classification layer; (c) shows parallel traversal of model space, wherein the underlying model coupled with a decoder defines a task model and task models populate a model space, with current models shown as black dots and previous models shown as gray dots; and (d) shows multiple loss signals. Each current task model receives a distinct loss to compute its distinct gradient. A task coupled with a decoder and its parameters defines a pseudo-task for the underlying model. A theme in MTL is that models for related tasks will have similar decoders, as implemented by explicit regularization. Similarly, in Eq. 2, through training, two decoders for the same task will instantiate similar models, and, as long as they do not converge completely to equality, they will simulate the effect of training with multiple closely-related tasks.

Notice that the innermost summation in Eq. 2 is over decoders. This calculation is computationally efficient: because each decoder for a given task takes the same input, $F(x_{ti})$ (usually the most expensive part of the model) need only be computed once per sample (and only once over all tasks if all tasks share $x_{ti}$). However, when evaluating the performance of a model, since each decoder induces a distinct model for a task, what matters is not the average over decoders, but the best performing decoder for each task, i.e., (Eq. 3)

$$\theta^*_{eval} = \underset{\theta}{\mathrm{argmin}} \frac{1}{T} \sum_{t=1}^{T} \frac{1}{N_t} \underset{d \in 1 \ldots D}{\mathrm{argmin}} \sum_{i=1}^{N_t} \mathcal{L}(y_{ti}, \hat{y}_{tdi}).$$

Eq. 2 is used in training because it is smoother; Eq. 3 is used for model validation, and to select the best performing decoder for each task from the final joint model. This decoder is then applied to future data, e.g., a holdout set. Once the models are trained, in principle they form a set of distinct and equally powerful models for each task. It may therefore be tempting to ensemble them for evaluation, i.e., (Eq. 4):

$$\theta^*_{ens} = \underset{\theta}{\mathrm{argmin}} \frac{1}{T} \sum_{t=1}^{T} \frac{1}{N_t} \sum_{i=1}^{N_t} \mathcal{L}\left(y_{ti}, \frac{1}{D}\sum_{d=1}^{D} \hat{y}_{tdi}\right).$$

However, with linear decoders, training with Eq. 4 is equivalent to training with a single decoder for each task, while training with Eq. 2 with multiple decoders yields more expressive training dynamics.

Following the intuition that training F with multiple decoders amounts to solving the task in multiple ways, each "way" is defined by a pseudo-task (Eq. 5):

$$(\mathcal{D}_{td}, \theta_{td}, \{x_{ti}, y_{ti}\}_{i=1}^{N_t})$$

Of the true underlying task $\{x_{ti}, y_{ti}\}_{i=1}^{N_t}$. It is termed a pseudo-task because it derives from a true task, but has no fixed labels. That is, for any fixed $\theta_{td}$, there are potentially many optimal outputs for $F(x_{ij})$. When $D>1$, training F amounts to training each task with multiple pseudo-tasks for each task at each gradient update step. This process is the essence of PTA.

As a first step, we consider linear decoders, i.e. each $\theta_{td}$ consists of a single dense layer of weights (any following nonlinearity can be considered part of the loss function). Similarly, with linear decoders, distinct pseudo-tasks for the same task simulate multiple closely-related tasks. When $\theta_{td}$ are considered fixed, the learning problem (Eq. 2) reduces to (Eq. 6):

$$\theta^*_{\mathcal{F}} = \underset{\theta_{\mathcal{F}}}{\mathrm{argmin}} \frac{1}{TD} \sum_{t=1}^{T} \frac{1}{N_t} \sum_{i=1}^{N_t} \sum_{d=1}^{D} \mathcal{L}(y_{ti}, \hat{y}_{tdi}).$$

In other words, although the overall goal is to learn models for T tasks, F is at each step optimized towards DT pseudotasks. Thus, training with multiple decoders may yield positive effects similar to training with multiple true tasks.

After training, the best model for a given task is selected from the final joint model, and used as the final model for that task (Eq. 3). Of course, using multiple decoders with identical architectures for a single task does not make the final learned predictive models more expressive. It is therefore natural to ask whether including additional decoders has any fundamental effect on learning dynamics. It turns out that even in the case of linear decoders, the training dynamics of using multiple pseudo-tasks strictly subsumes using just one.

Accordingly, given that a set of pseudotasks S1 simulates another S2 on F if for all $\theta_F$ the gradient update to $\theta_F$ when trained with S1 is equal to that with S2, there exist differentiable functions F and sets of pseudo-tasks of a single task that cannot be simulated by a single pseudo-task of that task, even when all decoders are linear.

Consider a task with a single sample (x; y), where y is a scalar. Suppose L (from Eq. 6) computes mean squared error, F has output dimension M, and all decoders are linear, with bias terms omitted for clarity. $D_d$ is then completely specified by the vector $w_d = \langle w_d^1, w_d^2, \ldots, w_d^M \rangle^T$. Suppose parameter updates are performed by gradient descent. The update rule for $\theta_F$ with fixed decoders $\{\mathcal{D}_d\}_{d=1}^{D}$ and learning rate $\alpha$ is then given by Eq. 7:

$$\theta_{\mathcal{F}} := \theta_{\mathcal{F}} - \alpha \sum_{d=1}^{D} \nabla_{\mathcal{F}} (y - w_d^T \mathcal{F}(x; \theta_{\mathcal{F}}))^2.$$

For a single fixed decoder to yield equivalent behavior, it must have equivalent update steps. The goal then is to choose (x; y), $\mathcal{F}$, $\{\theta_k\}_{k=1}^{K}$, $\{w_d\}_{d=1}^{D}$, and $\alpha > 0$, such that there are no $w_o$, $\gamma > 0$, for which $\forall k$(Eq. 8)

$$\alpha \sum_{d=1}^{D} \nabla_{\mathcal{F}} (y - w_d^\top \mathcal{F}(x; \theta_k))^2 =$$

$$\gamma \nabla_{\mathcal{F}} (y - w_o^\top \mathcal{F}(x; \theta_k))^2 \Longrightarrow \alpha \sum_{d=1}^{D} 2(y - w_d^\top \mathcal{F}(x; \theta_k)) w_d^\top J_{\mathcal{F}}(x; \theta_k) =$$

$$2\gamma(y - w_o^\top \mathcal{F}(x; \theta_k)) w_o^\top J_{\mathcal{F}}(x; \theta_k),$$

where $J_F$ is the Jacobian of F. By choosing F and $\{\theta_k\}_{k=1}^{K}$ so that all $J_F(x; \theta_k)$ have full row rank, Eq. 8 reduces to (Eq. 9):

$$\alpha \sum_{d=1}^{D} (y - w_d^\top \mathcal{F}(x; \theta_k)) w_d^j = \gamma(y - w_o^\top \mathcal{F}(x; \theta_k)) w_o^j \forall i \in 1 \ldots M.$$

Choosing F, $\{\theta_k\}_{k=1}^{K}$, $\{w_d\}_{d=1}^{D}$, and $\alpha > 0$ such that the left hand side of Eq. 9 is never zero, we can write Eq. 10:

$$\frac{\sum_{d=1}^{D}(y - w_d^\top \mathcal{F}(x; \theta_k))w_d^j}{(y - w_o^\top \mathcal{F}(x; \theta_k))w_o^j} =$$

$$\frac{\sum_{d=1}^{D}(y - w_d^\top \mathcal{F}(x; \theta_k))w_d^j}{(y - w_o^\top \mathcal{F}(x; \theta_k))w_o^i} \forall (i, j) \Longrightarrow \frac{\sum_{d=1}^{D}(y - w_d^\top \mathcal{F}(x; \theta_k))w_d^j}{\sum_{d=1}^{D}(y - w_d^\top \mathcal{F}(x; \theta_k))w_d^i} = \frac{w_o^j}{w_o^i}.$$

Then, since $w_o$ is fixed, it suffices to find $F(x; \theta_1)$, $F(x; \theta_2)$ such that for some $(i, j)$ (Eq. 11):

$$\frac{\sum_{d=1}^{D}(y - w_d^\top \mathcal{F}(x; \theta_1))w_d^j}{\sum_{d=1}^{D}(y - w_d^\top \mathcal{F}(x; \theta_1))w_d^i} \neq \frac{\sum_{d=1}^{D}(y - w_d^\top \mathcal{F}(x; \theta_2))w_d^j}{\sum_{d=1}^{D}(y - w_d^\top \mathcal{F}(x; \theta_2))w_d^i}.$$

For instance, with D=2, choosing $\gamma=1$, $w_1 = <2, 3>^T$, $w_2 = <4, 5>^T$, $F(x; \theta_1) = <6, 7>^T$, and $F(x; \theta_1) = <8, 9>^T$ satisfies the inequality. Note $F(x; \theta_1)$ and $F(x; \theta_2)$ can be chosen arbitrarily since F is only required to be differentiable, e.g., implemented by a neural network.

Showing that a single pseudo-task can be simulated by D pseudo-tasks for any D>1 is more direct: For any $w_o$ and $\gamma$, choose $w_d = w_o \forall d2 \in 1 \ldots D$ and $\alpha = \gamma/D$. Further extensions to tasks with more samples, higher dimensional outputs, and cross-entropy loss are straightforward. Note that this result is related to work on the dynamics of deep linear models, in that adding additional linear structure complexifies training dynamics. However, training an ensemble directly, i.e., via Eq. 4, does not yield augmented training dynamics, since (Eq. 12):

$$\frac{1}{D}\sum_{d=1}^{D} \hat{y}_{tdi} = \frac{1}{D}\sum_{d=1}^{D} W_{td}^\top \mathcal{F}(x_{ti}; \theta_{\mathcal{F}}) \Longrightarrow W_{to}^\top = \frac{1}{D}\sum_{d=1}^{D} W_{td}^\top \text{ and } \beta = \alpha.$$

Knowing that training with additional pseudo-tasks yields augmented training dynamics, this may be exploited as discussed further herein.

Given linear decoders, the primary goal is to optimize F; if an optimal F were found, optimal decoders for each task could be derived analytically. So, given multiple linear decoders for each task, how should their induced pseudotasks be controlled to maximize the benefit to F? For one, their weights $\{W_{td}\}_{d=1}^{D}$ must not all be equal, otherwise we would have $W_{to} = W_{t1}$ and $\gamma = D\alpha$ in the proof of: there exist differentiable functions F and sets of pseudo-tasks of a single task that cannot be simulated by a single pseudo-task of that task, even when all decoders are linear Following Eq. 2, decoders can be trained jointly with F via gradient-based methods, so that they learn to work well with F. Through optimization, a trained decoder induces a trajectory of pseudo-tasks. Going beyond this implicit control, Algorithm 1 set forth in FIG. 7 gives a high-level framework for applying explicit control to pseudo-task trajectories. An instance of the algorithm is parameterized by choices for DecInitialize, which defines how decoders are initialized; and DecUpdate, which defines non-gradient-based updates to decoders every M gradient steps, i.e., every meta-iteration, based on the performance of each decoder (DecUpdate defaults to no-op). Several intuitive methods are evaluated for instantiating Algorithm 1. These methods can be used together in any combination.

First, the Independent Initialization (I) DecInitialize randomly initializes all $\theta_{Dtd}$ independently. This is the obvious initialization method, and is assumed in all methods below. Next, the Freeze (F) DecInitialize freezes all decoder weights except $\theta_{Dt1}$ for each task. Frozen weights do not receive gradient updates in Line 7 of Algorithm 1. Because they cannot adapt to F, constant pseudo-task trajectories provide a stricter constraint on F. One decoder is left unfrozen so that the optimal model for each task can still be learned. The Independent Dropout (D) DecInitialize sets up the dropout layers preceding linear decoder layers to drop out values independently for each decoder. Thus, even when the weights of two decoders for a task are equal, their resulting gradient updates to F and to themselves will be different.

For the next three methods, let $c_t^{min} = \min(c_{t1}, \ldots, c_{tD})$. Perturb (P) DecUpdate adds noise~$N(0, \epsilon_p I)$ to each $\theta_{Dtd}$ for all d where $c_{td} \neq c_t^{min}$. This method ensures that $\theta_{Dtd}$ are sufficiently distinct before each training period. Hyperperturb (H) is like Perturb, except DecUpdate updates the hyperparameters of each decoder other than the best for each task, by adding noise~$N(0, \epsilon_h)$. In these examples, each decoder has only one hyperparameter: the dropout rate of any Independent Dropout layer, because adapting dropout rates can be beneficial. Greedy (G) For each task, let $\theta_t^{min}$ be the weights of a decoder with cost $c_t^{min}$. DecUpdate updates all $\theta_{td} := \theta_t^{min}$, including hyperparameters. This biases training to explore the highest-performing areas of the pseudo-task space. When combined with any of the previous three methods, decoder weights are still ensured to be distinct through training.

Combinations of these six methods induce an initial class of PTA training algorithms PTA-*for the case of linear decoders. The following eight representative combinations of these methods, i.e., PTA-I, PTA-F, PTA-P, PTA-D, PTA-FP, PTA-GP, PTA-GD, and PTA-HGD, in various experimental settings are evaluated below. Note that H and G are related to methods that copy the weights of the entire network. Also note that, in a possible future extension to the nonlinear case, the space of possible PTA control methods becomes much broader, as will be discussed herein.

Experiment

In this section, PTA methods are evaluated and shown to excel in a range of settings: (1) single-task character recognition; (2) multitask character recognition; (3) single-task sentiment classification; and (4) multitask visual attribute classification. All experiments are implemented using the Keras framework as is known in the art. For PTA-P and PTA-GP, $\epsilon_p$=0:01; for PTA-HGD, $\epsilon_h$=0:1 and dropout rates range from 0.2 to 0.8. A dropout layer with dropout rate initialized to 0.5 precedes each decoder.

Omniglot Character Recognition

The Omniglot dataset consists of 50 alphabets of handwritten characters, each of which induces its own character recognition task. Each character instance is a 105×105 black-and-white image, and each character has 20 instances, each drawn by a different individual. To reduce variance and improve reproducibility of experiments, a fixed random 50/20/30% train/validation/test split was used for each task. Methods are evaluated with respect to all 50 tasks as well as a subset consisting of the first 20 tasks in a fixed random ordering of alphabets used in previous work (Meyerson & Miikkulainen, Beyond Shared Hierarchies: Deep Multitask Learning through Soft Layer Ordering, ICLR (2018)). The underlying model F for all setups is a simple four layer convolutional network that has been shown to yield good performance on Omniglot. This model has four convolutional layers each with 53 filters and 3×3 kernels, and each followed by a 2×2 max-pooling layer and dropout layer with 0.5 dropout probability. At each meta-iteration, 250 gradient updates are performed via Adam; each setup is trained for 100 meta-iterations.

Figure 8B:
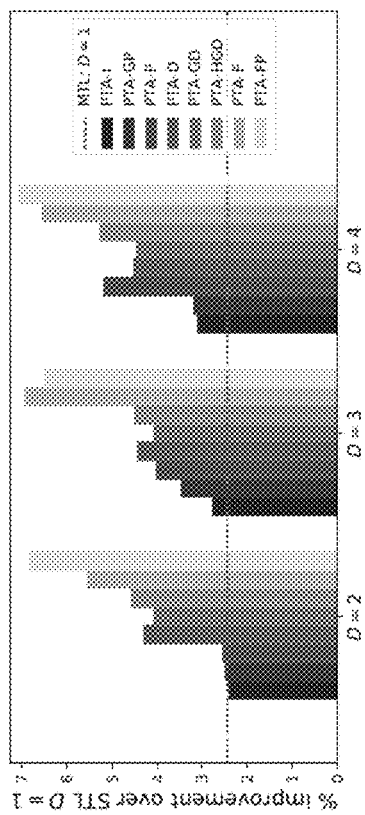
FIGS. 8*a* and 8*b* illustrate omniglot single-task (FIG. 8*a*) and multitask (FIG. 8*b*) learning results.
Figure 8A:
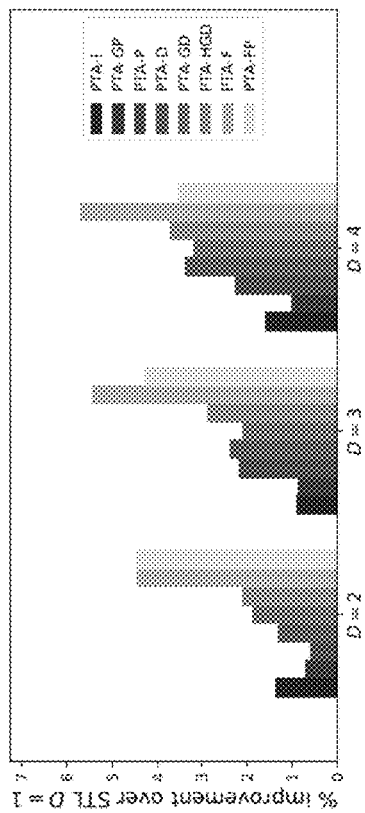

The single-task learning case is considered first. For each of the 20 initial Omniglot tasks, the eight PTA methods were applied to the task with 2, 3, and 4 decoders. At least three trials were run with each setup; the mean performance averaged across trials and tasks is shown in FIG. 8a. Every PTA setup outperforms the baseline, i.e., training with a single decoder. The methods that use decoder freezing, PTA-F and PTA-FP, perform best, showing how this problem can benefit from strong regularization. Notably, the mean improvement across all methods increases with D: 1.86% for D=2; 2.33% for D=3; and 2.70% for D=4. Like MTL can benefit from adding more tasks, single-task learning can benefit from adding more pseudo-tasks.

Omniglot models have also been shown to benefit from MTL. This section extends the experiments in STL to MTL. The setup is exactly the same, except now the underlying convolutional model is fully shared across all tasks for each method. The results are shown in FIG. 8b. All setups outperform the STL baseline, and all, except for PTA-I with D=2, outperform the MTL baseline. Again, PTA-F and PTA-FP perform best, and the mean improvement across all methods increases with D. The results show that although PTA implements behavior similar to MTL, when combined, their positive effects are complementary. Finally, to test the scalability of these results, three diverse PTA methods with D=4 and D=10 were applied to the complete 50-task dataset: PTA-I, because it is the baseline PTA method; PTA-F, because it is simple and high-performing; and PTA-HGD, because it is the most different from PTA-F, but also relatively high-performing. The results are given in Table 1.

TABLE 1

| | Method | | | |
|---|---|---|---|---|
| | Single-task Learning 35.49 | | Multitask Learning 29.02 | |
| Baseline | D = 4 | D = 10 | D = 4 | D = 10 |
| PTA-I | 31.72 | 32.56 | 27.26 | 24.50 |
| PTA-HGD | 31.63 | 30.39 | 25.77 | 26.55 |
| PTA-F | 29.37 | 28.48 | 23.45 | 23.36 |
| PTA-Mean | 30.91 | 30.48 | 25.49 | 24.80 |

The results agree with the 20-task results, with all methods improving upon the baseline, and performance overall improving as D is increased.

Next, PTA to LSTM models are applied in the IMDB sentiment classification problem. The dataset consists of 50K natural-language movie reviews, 25K for training and 25K for testing. There is a single binary classification task: whether a review is positive or negative. As in previous work, 2500 of the training reviews are withheld for validation. The underlying model F is the off-the-shelf LSTM model for IMDB provided by Keras, with no parameters or preprocessing changed. In particular, the vocabulary is capped at 20K words, the LSTM layer has 128 units and dropout rate 0.2, and each meta-iteration consists of one epoch of training with Adam. This model, but it is a very different architecture from that used in Omniglot, and therefore serves to demonstrate the broad applicability of PTA.

The final three PTA methods from Section 4.1 were evaluated with 4 and 10 decoders (Table 2).

TABLE 2

| | Method Test Accuracy % 82.75 (±0.13) | |
|---|---|---|
| LSTM Baseline (D = 1) | D = 4 | D = 10 |
| PTA-I | 83.20 (±0.07) | 83.02 (±0.11) |
| PTA-HGD | 83.22 (±0.05) | 83.51 (±0.08) |
| PTA-F | 83.30 (±0.12) | 83.30 (±0.08) |

All PTA methods outperform the baseline. In this case, however, PTA-HGD with D=10 performs best. Notably, PTA-I and PTA-F do not improve from D=4 to D=10, suggesting that underlying models have a critical point after which, without careful control, too many decoders can be over constraining. To contrast PTA with standard regularization, additional Baseline experiments were run with dropout rates [0.3, 0.4, . . . , 0.9]. At 0.5 the best accuracy was achieved: 83.14 (+/−0.05), which is less than all PTA variants except PTA-I with D=10, thus confirming that PTA adds value. To help understand what each PTA method is actually doing, snapshots of decoder parameters taken every epoch are visualized in FIG. 9(a)-9(c) with t-SNE using cosine distance. Each shape corresponds to a particular decoder; each point is a projection of the length-129 weight vector at the end of an epoch, with opacity increasing by epoch. The behavior matches our intuition for what should be happening in each case: When decoders are only initialized independently, their pseudo-tasks gradually converge;

when all but one decoder is frozen, the unfrozen one settles between the others; and when a greedy method is used, decoders perform local exploration as they traverse the pseudo-task space together.

To further test applicability and scalability, PTA was evaluated on CelebA large-scale facial attribute recognition. The dataset consists of ≈200K 178×218 color images. Each image has binary labels for 40 facial attributes; each attribute induces a binary classification task. Facial attributes are related at a high level that deep models can exploit, making CelebA a popular deep MTL benchmark. Thus, this experiment focuses on the MTL setting.

The underlying model was Inception-ResNet-v2, with weights initialized from training on ImageNet. Due to computational constraints, only one PTA method was evaluated: PTA-HGD with D=10. PTA-HGD was chosen because of its superior performance on IMDB, and because CelebA is a large-scale problem that may require extended pseudo-task exploration. FIG. 9(c) shows how PTA-HGD may support such exploration above other methods. Each meta-iteration consists of 250 gradient updates with batch size 32. The optimizer schedule is co-opted from previous work by Gunter et al., AFFACT—alignment free facial attribute classification technique. Corer, abs/1611.06158v2, 2017. RMSprop is initialized with a learning rate of $10^{-4}$, which is decreased to $10^{-5}$ and $10^{-6}$ when the model converges. PTA-HGD and the MTL baseline were each trained three times. The computational overhead of PTA-HGD is marginal, since the underlying model has 54M parameters, while each decoder has only 1.5K. Table 3 shows the results.

TABLE 3

| MTL Method | % Error |
|---|---|
| Single Task (He et al., 2017) | 10.37 |
| MOON (Rudd et al., 2016) | 9.06 |
| Adaptive Sharing (Lu et al., 2017) | 8.74 |
| MCNN-AUX (Hand & Chellappa, 2017) | 8.71 |
| Soft Order (Meyerson & Miikkulainen, 2018) | 8.64 |
| VGG-16 MTL (Lu et al., 2017) | 8.56 |
| Adaptive Weighting (He et al., 2017) | 8.20 |
| AFFACT (Günther et al., 2017) (best of 3) | 8.16 |
| MTL Baseline (Ours; mean of 3) | 8.14 |
| PTA-HGD, D = 10 (mean of 3) | 8.10 |
| Ensemble of 3: AFFACT (Günther et al., 2017) | 8.00 |
| Ensemble of 3: PTA-HGD, D = 10 | 7.94 |

Figure 10:
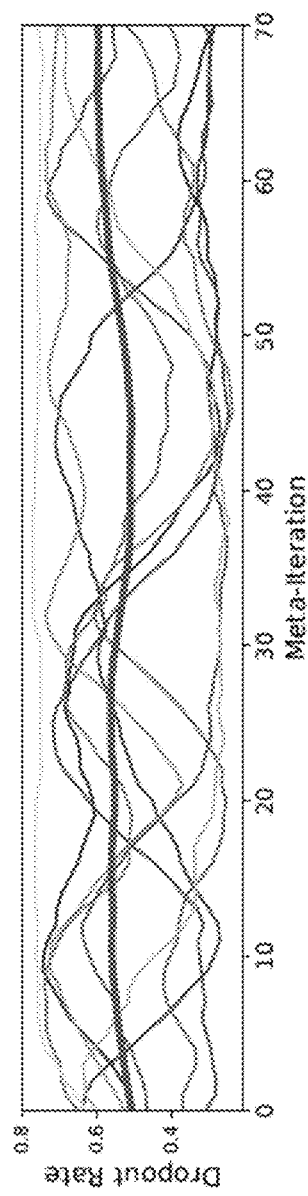
FIG. 10 shows mean dropout schedule across all 400 pseudo-tasks in a run of PTA-HGD in accordance with an embodiment herein.

PTA-HGD outperforms all other methods, thus establishing a new state-of-the-art in CelebA. FIG. 10 shows resulting dropout schedules for PTA-HGD. The thick line shows the mean dropout schedule across all 400 pseudo-tasks in a run of PTA-HGD. Each of the remaining lines shows the schedule of a particular task, averaged across their 10 pseudo-tasks. All lines are plotted with a simple moving average of length 10. The diversity of schedules shows that the system is taking advantage of PTAHGD's ability to adapt task-specific hyperparameter schedules. No one type of schedule dominates; PTA-HGD gives each task the flexibility to adapt its own schedule via the performance of its pseudo-tasks.

As described herein PTA is broadly applicable, and can boost performance in a variety of single-task and multitask problems. Training with multiple decoders for a single task allows a broader set of models to be visited. If these decoders are diverse and perform well, then the shared structure has learned to solve the same problem in diverse ways, which is a hallmark of robust intelligence. In the MTL setting, controlling each task's pseudo-tasks independently makes it possible to discover diverse task-specific learning dynamics (FIG. 10). Increasing the number of decoders can also increase the chance that pairs of decoders align well across tasks. The crux of PTA is the method for controlling pseudo-task trajectories. Experiments showed that the amount of improvement from PTA is dependent on the choice of control method. Different methods exhibit highly structured but different behavior (FIGS. 9(a) to 9(c)). The success of initial methods indicates that developing more sophisticated methods is a promising avenue of future work. In particular, methods for training multiple models separately for a single task can be co-opted to control pseudo-task trajectories more effectively. Consider, for instance, the most involved method evaluated in this paper: PTA-HGD. This online decoder search method could be replaced by methods that generate new models more intelligently, such methods being known to those in the art. Such methods will be especially useful in extending PTA beyond the linear case considered in this paper, to complex nonlinear decoders. For example, since a set of decoders is being trained in parallel, it could be natural to use neural architecture search methods to search for optimal decoder architectures.

While the technology disclosed is disclosed by reference to various embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

The invention claimed is:

1. A neural network-based joint model coupled to memory and running on one or more parallel processors, comprising:
    an encoder that processes an input and generates an encoding;
    a plurality of decoders that are grouped into sets of decoders in dependence upon corresponding classification tasks,
    wherein each of the plurality of decoders respectively receive the encoding as input from the encoder, thereby forming encoder-decoder pairs which operate independently of each other when performing the corresponding classification tasks T,
    wherein each of the plurality of decoders respectively process the received encoding including processing the encoding through their individual decoder layers and classification layers and produce classification scores for classes defined for the corresponding classification tasks; and
    a trainer that jointly trains the encoder-decoder pairs over at least one backpropagation iterations to perform the corresponding classification tasks wherein the trainer is further configured to comprise:
        a forward pass stage that processes training inputs through each single encoder and resulting encodings through each of the plurality of decoders, wherein the plurality of decoders includes decoders for performing different classification tasks, paired with a same single encoder to compute respective activations for each of the training inputs;
        a backward pass stage, that, over each of the at least one thousand backpropagation iterations;
            determines gradient data for the each of the plurality of decoders for each of the training inputs in dependence upon a loss function, wherein the loss function is cross entropy that uses either a maximum likelihood objective function, a policy gradient function, or both;

averages the gradient data determined for the each of the plurality of decoders; and
determines gradient data for the same single encoder by backpropagating the averaged gradient data for all of the plurality of decoders through the same single encoder;
an update stage that modifies weights of each single encoder in dependence upon the gradient data determined for the single encoder from the plurality of decoders paired therewith; and
a persistence stage that, upon convergence after a final backpropagation iteration, persists in the memory the modified weights of the encoder derived by the training to be applied to future classification tasks;
wherein for each classification task T, a single model, including a jointly trained encoder-decoder pair, is selected from the jointly trained multiple encoder-decoder pairs in the joint model.

2. The neural network-based model of claim 1, wherein the encoder is paired with the plurality of decoders D including the plurality of decoders from a same set of decoders and the plurality of decoders from a different set of decoders, wherein each of the plurality of decoders in the same set of decoders performs a first classification task and each of the plurality of decoder in the different set of decoders performs a second classification task.

3. The neural network-based model of any of claim 2, further configured to use a combination of the modified weights of the encoder derived by the training and modified weights of each decoder within a set of decoders derived by the training to perform the corresponding classification tasks on inference inputs, and
wherein the inference inputs are processed by the encoder to produce encodings, followed by one of the decoders processing the encodings to output classification scores for classes defined for the corresponding classification tasks.

4. The neural network-based model of claim 2, further configured to use a combination of the modified weights of the encoder derived by the training and modified weights of two or more of the decoders derived by the training to respectively perform two or more of the classification tasks on inference inputs, and
wherein the inference inputs are processed by the encoder to produce encodings, followed by the two or more of the decoders respectively processing the encodings to output classification scores for classes defined for the two or more of the classification tasks.

5. The neural network-based model of claim 4, wherein the input, the training inputs, and the inference inputs are selected from a group consisting of image data, text data and genomic data.

6. The neural network-based model of claim 2, wherein each training input is annotated with a plurality of task-specific labels for the corresponding classification tasks.

7. The neural network-based model of any of claim 1, wherein a plurality of training inputs for the corresponding classification tasks are fed in parallel to the encoder as input in each forward pass iteration, and
wherein each training input is annotated with a task-specific label for a corresponding classification task.

8. The neural network-based model of claim 1, wherein the encoder is a convolutional neural network (abbreviated CNN) with a plurality of convolution layers arranged in a sequence from lowest to highest.

9. The neural network-based model of claim 1, wherein the encoding is convolution data.

10. The neural network-based model of claim 1, wherein each decoder further comprises at least one decoder layer and at least one classification layer.

11. The neural network-based model of claim 10, wherein each of the numerous decoders is a fully-connected neural network (abbreviated FCNN) and the decoder layer is a fully-connected layer.

12. The neural network-based model of claim 10, wherein the at least one classification layer is a sigmoid classifier.

13. The neural network-based model of claim 10, wherein the at least one classification layer is a softmax classifier.

14. The neural network-based model of claim 1, wherein the encoder is a recurrent neural network (abbreviated RNN), including long short-term memory (LSTM) network or gated recurrent unit (GRU) network.

15. The neural network-based model of claim 1, wherein the encoding is hidden state data.

16. The neural network-based model of claim 1, wherein each decoder is a recurrent neural network (abbreviated RNN), including long short-term memory (LSTM) network or gated recurrent unit (GRU) network.

17. The neural network-based model of claim 1, wherein each decoder is a convolutional neural network (abbreviated CNN) with a plurality of convolution layers arranged in a sequence from lowest to highest.

18. The neural network-based model of claim 1, wherein the encoder is a fully-connected neural network (abbreviated FCNN) with at least one fully-connected layer.

19. The neural network-based model of claim 1, wherein at least some of the decoders are of a first neural network type, at least some of the decoders are of a second neural network type, and at least some of the decoders are of a third neural network type.

20. The neural network-based model of claim 1, wherein at least some of the decoders are convolutional neural networks (abbreviated CNNs) with a plurality of convolution layers arranged in a sequence from lowest to highest, at least some of the decoders are recurrent neural networks (abbreviated RNNs), including long short-term memory (LSTM) networks or gated recurrent unit (GRU) networks, and at least some of the decoders are fully-connected neural networks (abbreviated FCNNs).

21. The neural network-based model of claim 1, further configured to comprise an initializer that initializes the decoders with random weights.

22. The neural network-based model of claim 21, further configured to comprise the initializer that freezes weights of some decoders for certain number of backpropagation iterations while updating weights of at least one high performing decoder among the decoders over the certain number of backpropagation iterations, and wherein the high performing decoder is identified based on performance on validation data.

23. The neural network-based model of claim 21, further configured to comprise the initializer that periodically and randomly drops out weights of the decoders after certain number of backpropagation iterations.

24. The neural network-based model of claim 21, further configured to comprise the initializer that periodically perturbs weights of the decoders after certain number of backpropagation iterations by adding random noise to the weights.

25. The neural network-based model of claim 21, further configured to comprise the initializer that periodically perturbs hyperparameters of the decoders after certain number of backpropagation iterations by randomly changing a rate at which weights of the decoders are randomly dropped out.

26. The neural network-based model of claim 21, further configured to comprise the initializer that identifies at least one high performing decoder among the decoders after every certain number of backpropagation iterations and copies weights and hyperparameters of the high performing decoder to the other decoders, and wherein the high performing decoder is identified based on performance on validation data.

27. A neural network-implemented method for training a joint model coupled to memory and running on one or more parallel processors, including:
    processing an input through an encoder and generating an encoding;
    processing the encoding through numerous decoders D including processing the encoding through each decoder's individual decoder layers and classification layers and producing classification scores for classes defined for corresponding classification tasks T, wherein the numerous decoders are grouped into sets of decoders in dependence upon a corresponding classification task and respectively receive the encoding as input from the encoder, wherein the encoder is paired with multiple decoders including multiple decoders from a same set of decoders and multiple decoders from a different set of decoders, wherein each decoder in the same set of decoders performs a first classification task and each decoder in the different set of decoders performs a second classification task thereby forming encoder-decoder pairs which operate independently of each other; and
    jointly training the encoder-decoder pairs over at least one thousand backpropagation iterations to perform the corresponding classification tasks wherein the jointly training includes:
        forward pass stage processing to train inputs through each single encoder and resulting encodings through each of the multiple decoders, wherein the multiple decoders includes decoders for performing different classification tasks, paired with a same single encoder to compute respective activations for each of the training inputs;
        backward pass stage processing over each of the at least one thousand backpropagation iterations including,
            determining gradient data for the each of the multiple decoders for each of the training inputs in dependence upon a loss function, wherein the loss function is cross entropy that uses either a maximum likelihood objective function, a policy gradient function, or both;
            averaging the gradient data determined for the each of the multiple decoders; and
            determining gradient data for the same single encoder by backpropagating the averaged gradient data for all of the multiple decoders through the same single encoder;
        update stage processing for modifying weights of each single encoder in dependence upon the gradient data determined for the single encoder from the multiple decoders paired therewith; and
        persistence stage processing that, upon convergence after a final backpropagation iteration, persists in the memory the modified weights of the encoder derived by the training to be applied to future classification tasks;
    selecting for each classification task T, a single model, including a jointly trained encoder-decoder pair, from the jointly trained multiple encoder-decoder pairs in the joint model.

28. A non-transitory computer readable storage medium impressed with computer program instructions, which, when executed on a processor, implement a neural network-implemented method to train a joint model coupled to memory and running on one or more parallel processors, the method comprising:
    processing an input through an encoder and generating an encoding;
    processing the encoding through numerous decoders D including processing the encoding through each decoder's individual decoder layers and classification layers and producing classification scores for classes defined for corresponding classification tasks T, wherein the numerous decoders are grouped into sets of decoders in dependence upon a corresponding classification task and respectively receive the encoding as input from the encoder, wherein the encoder is paired with multiple decoders including multiple decoders from a same set of decoders and multiple decoders from a different set of decoders, wherein each decoder in the same set of decoders performs a first classification task and each decoder in the different set of decoders performs a second classification task thereby forming encoder-decoder pairs which operate independently of each other; and
    jointly training the encoder-decoder pairs over at least one thousand backpropagation iterations to perform the corresponding classification tasks wherein the jointly training includes:
        forward pass stage processing to train inputs through each single encoder and resulting encodings through each of the multiple decoders, wherein the multiple decoders includes decoders for performing different classification tasks, paired with a same single encoder to compute respective activations for each of the training inputs;
        backward pass stage processing over each of the at least one thousand backpropagation iterations including,
            determining gradient data for the each of the multiple decoders for each of the training inputs in dependence upon a loss function, wherein the loss function is cross entropy that uses either a maximum likelihood objective function, a policy gradient function, or both;
            averaging the gradient data determined for the each of the multiple decoders; and
            determining gradient data for the same single encoder by backpropagating the averaged gradient data for all of the multiple decoders through the same single encoder;
        update stage processing for modifying weights of each single encoder in dependence upon the gradient data determined for the single encoder from the multiple decoders paired therewith; and
        persistence stage processing that, upon convergence after a final backpropagation iteration, persists in the memory the modified weights of the encoder derived by the training to be applied to future classification tasks;
    selecting for each classification task T, a single model, including a jointly trained encoder-decoder pair, from the jointly trained multiple encoder-decoder pairs in the joint model.

* * * * *